March 18, 1969  R. M. STANLEY  3,433,440
ERECTOR AND POSITIONING DEVICES FOR AIR CREW
ESCAPE SYSTEM ROCKET
Filed Dec. 9, 1966  Sheet 1 of 14
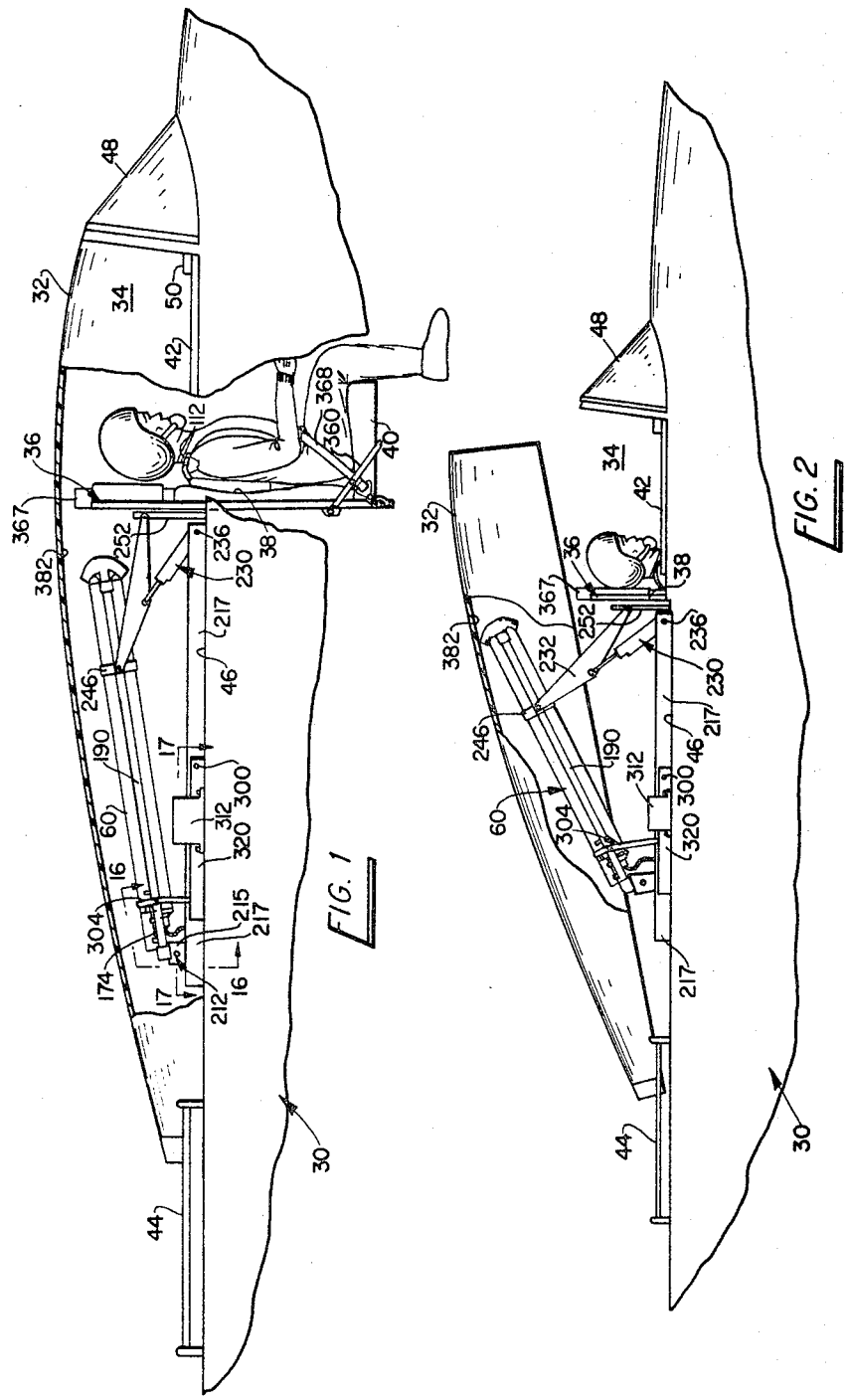
INVENTOR.
ROBERT M. STANLEY
BY
Strauch, Nolan, Neale, Nies & Kurz
ATTORNEYS

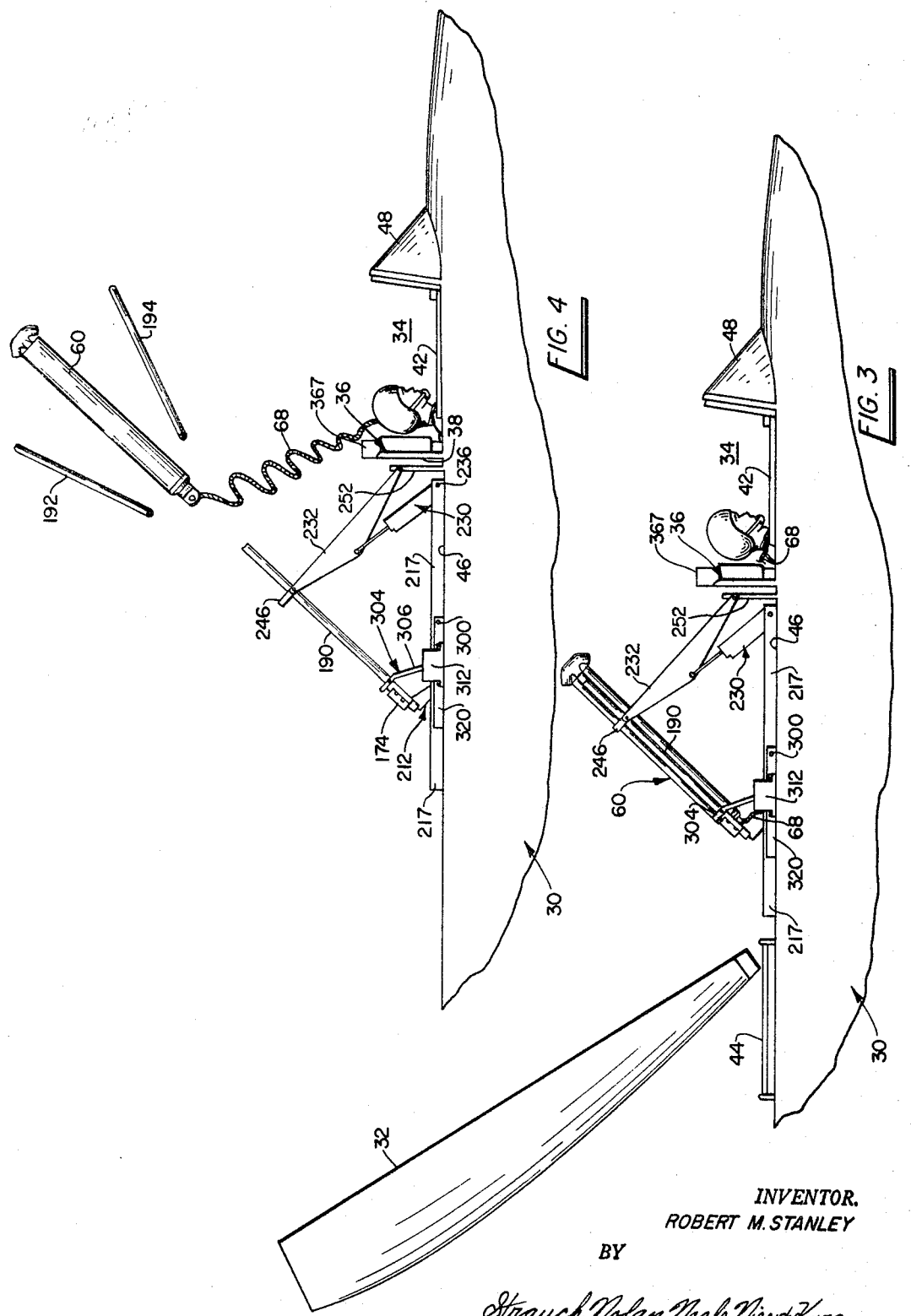

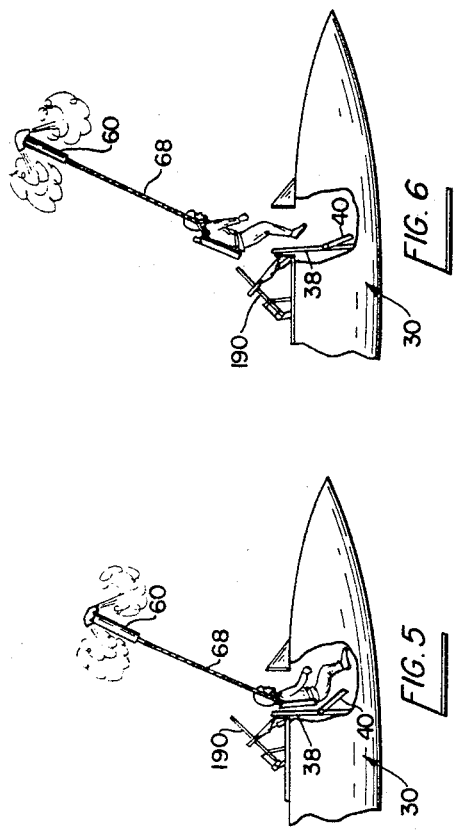
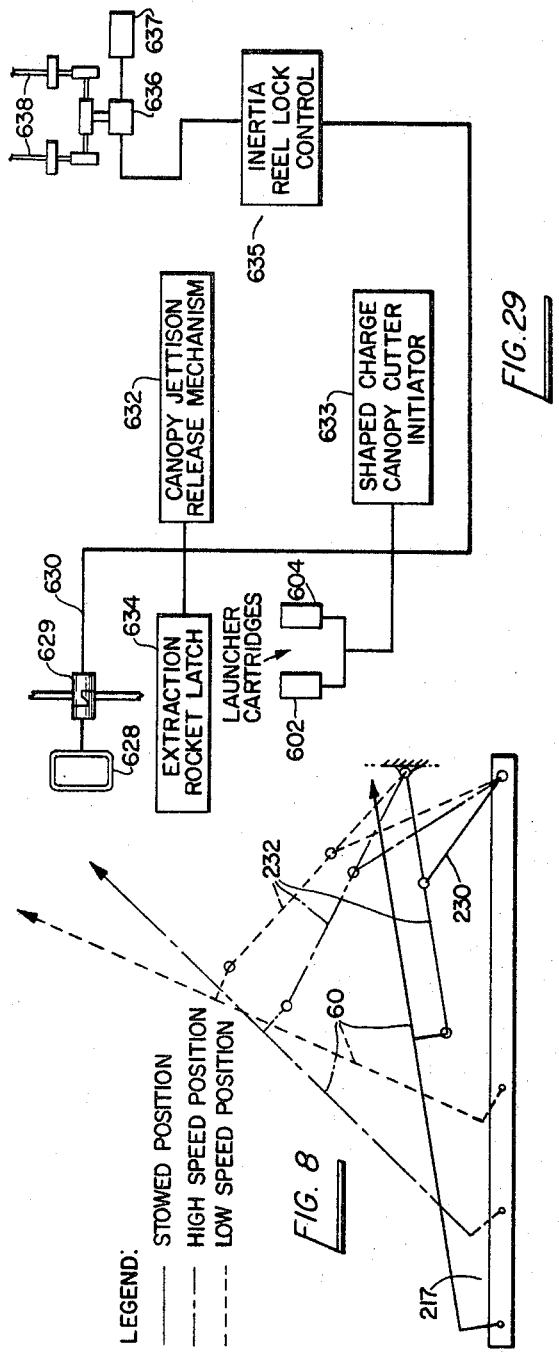

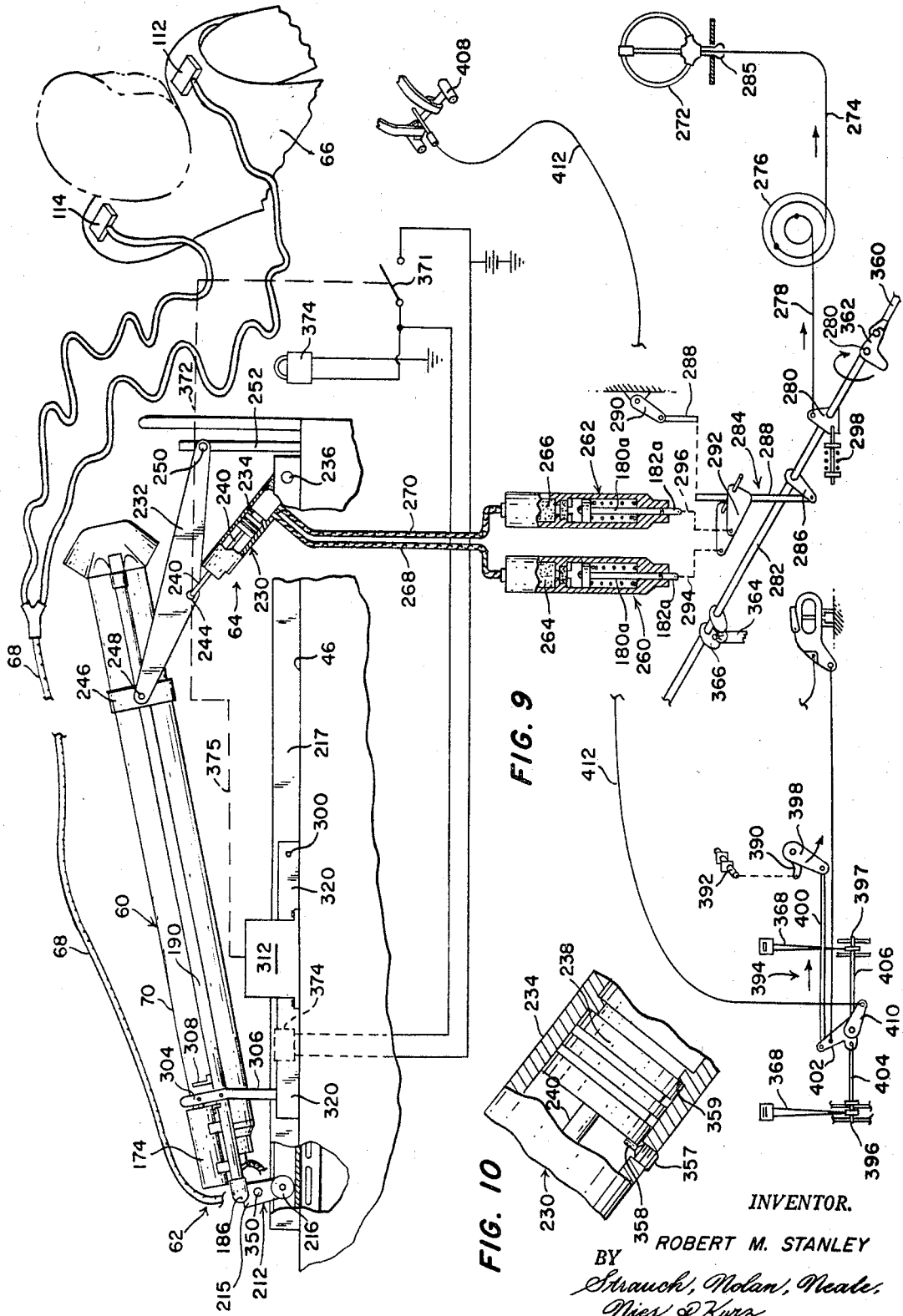

INVENTOR.
ROBERT M. STANLEY

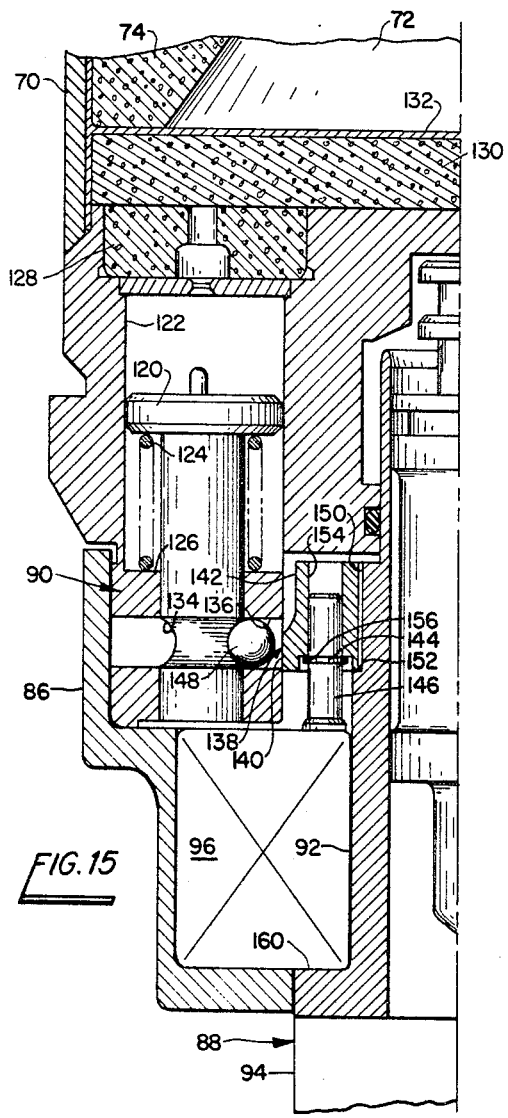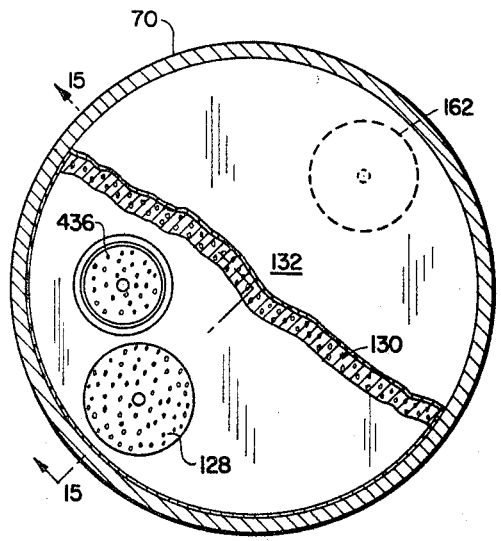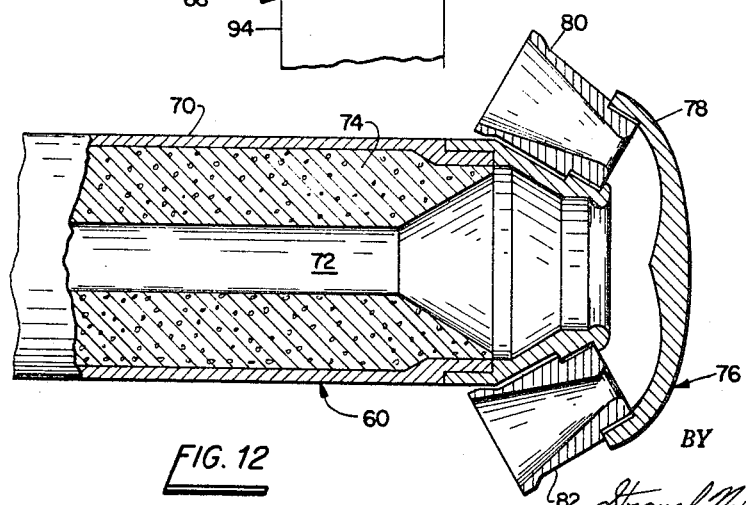

INVENTOR.
ROBERT M. STANLEY

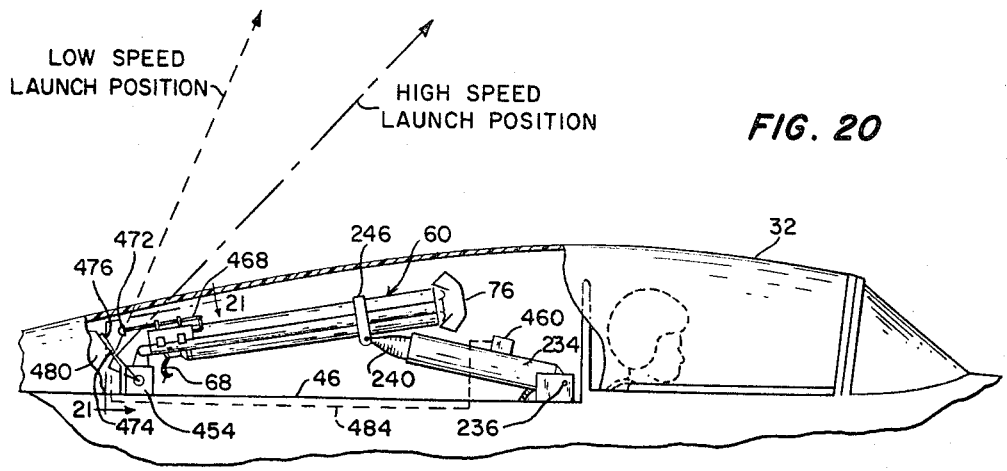
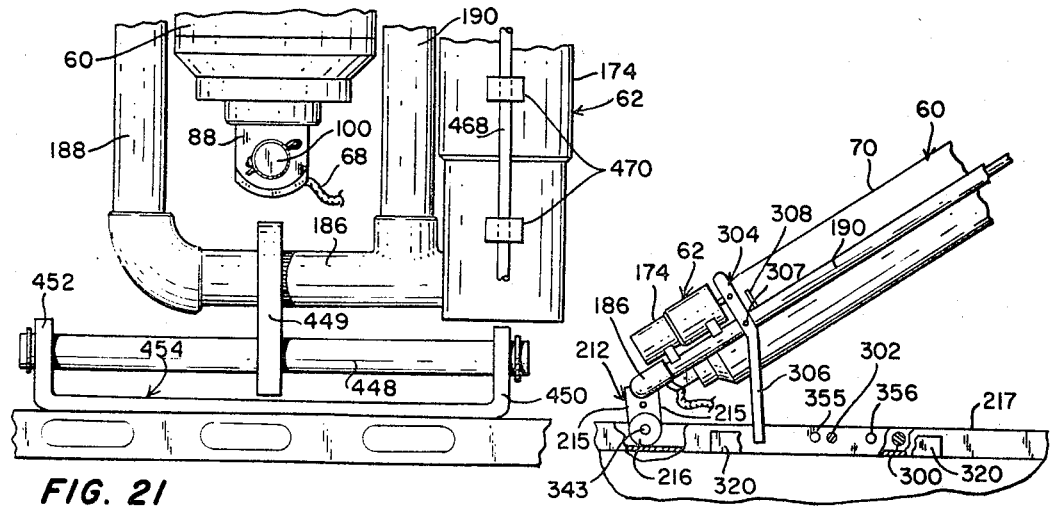
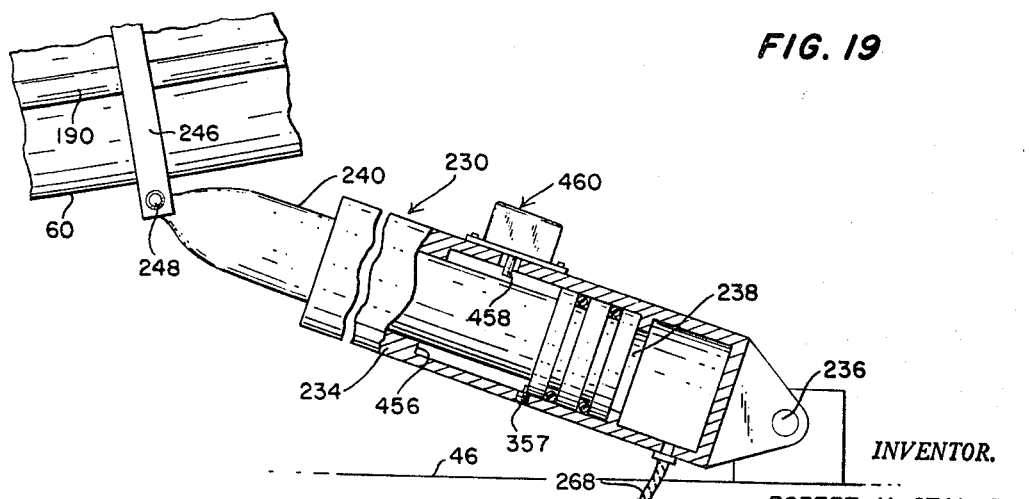

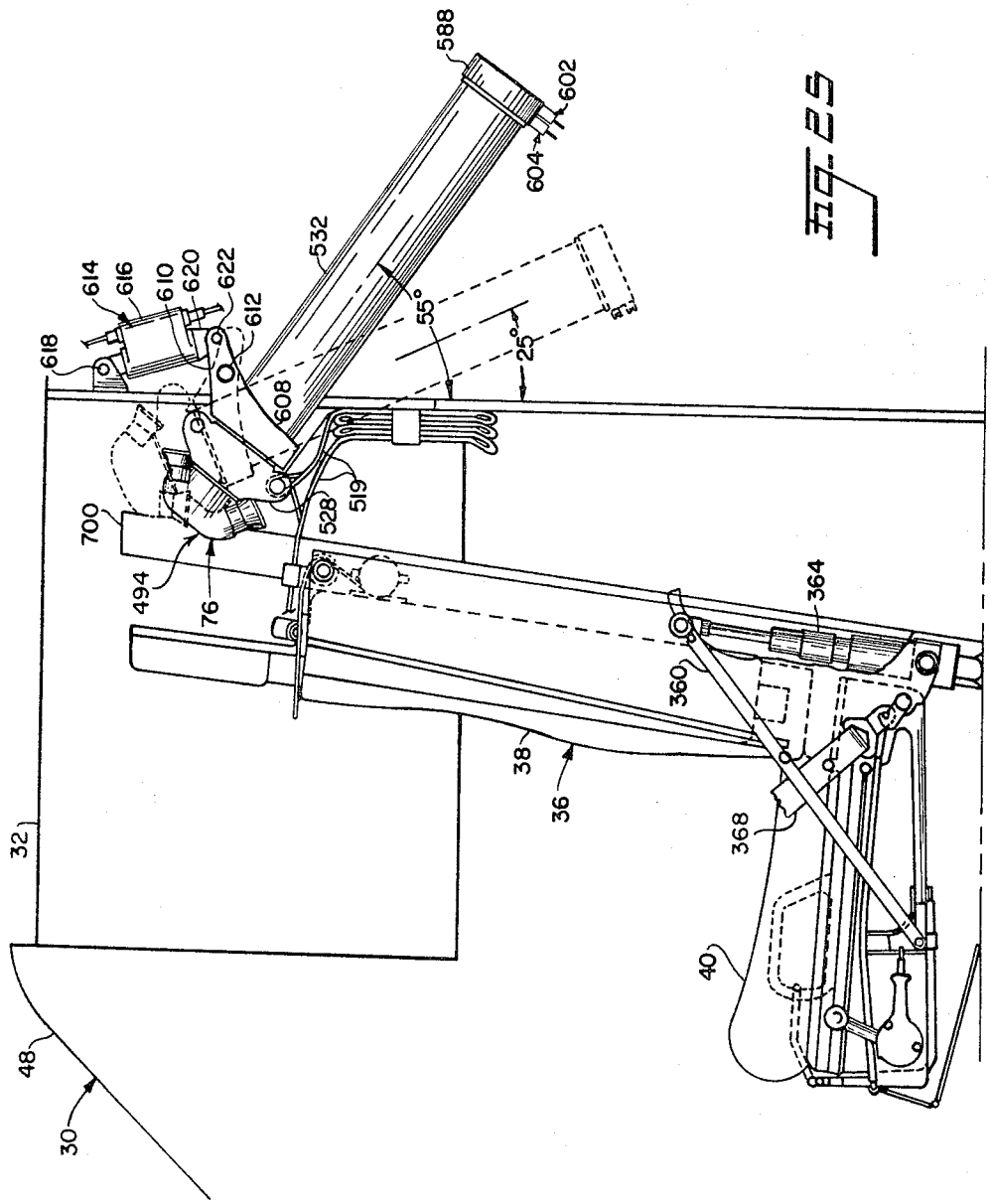

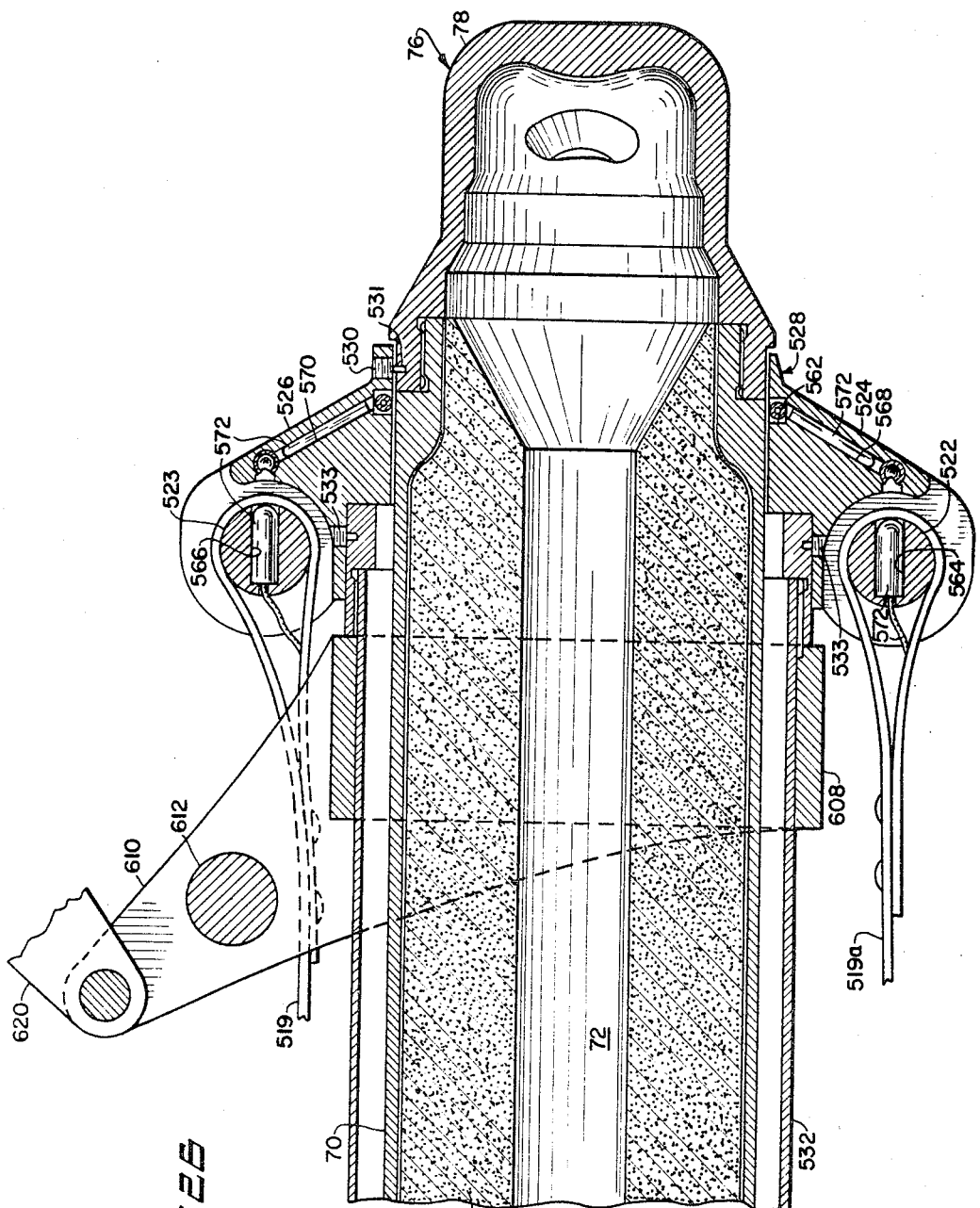

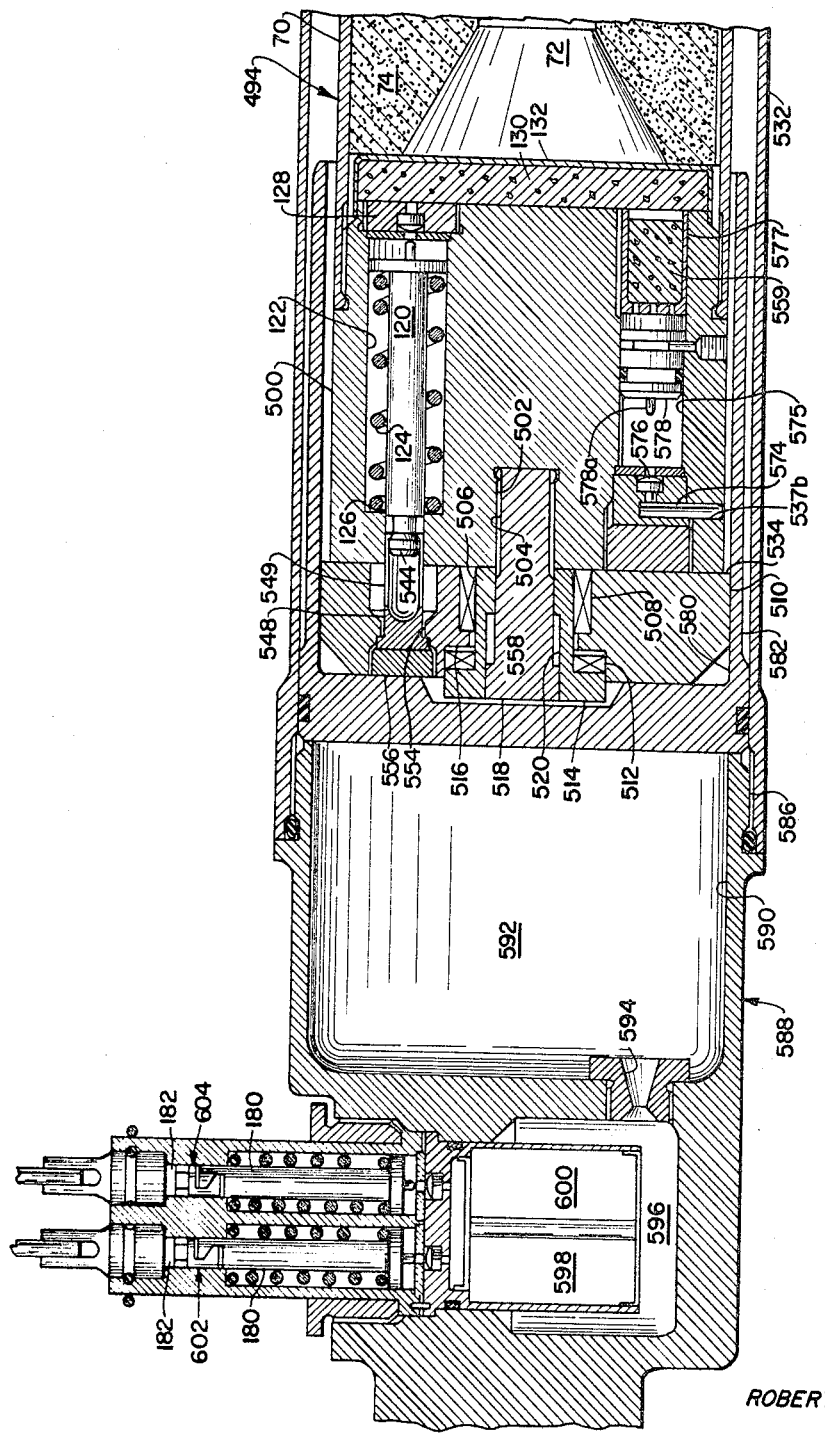

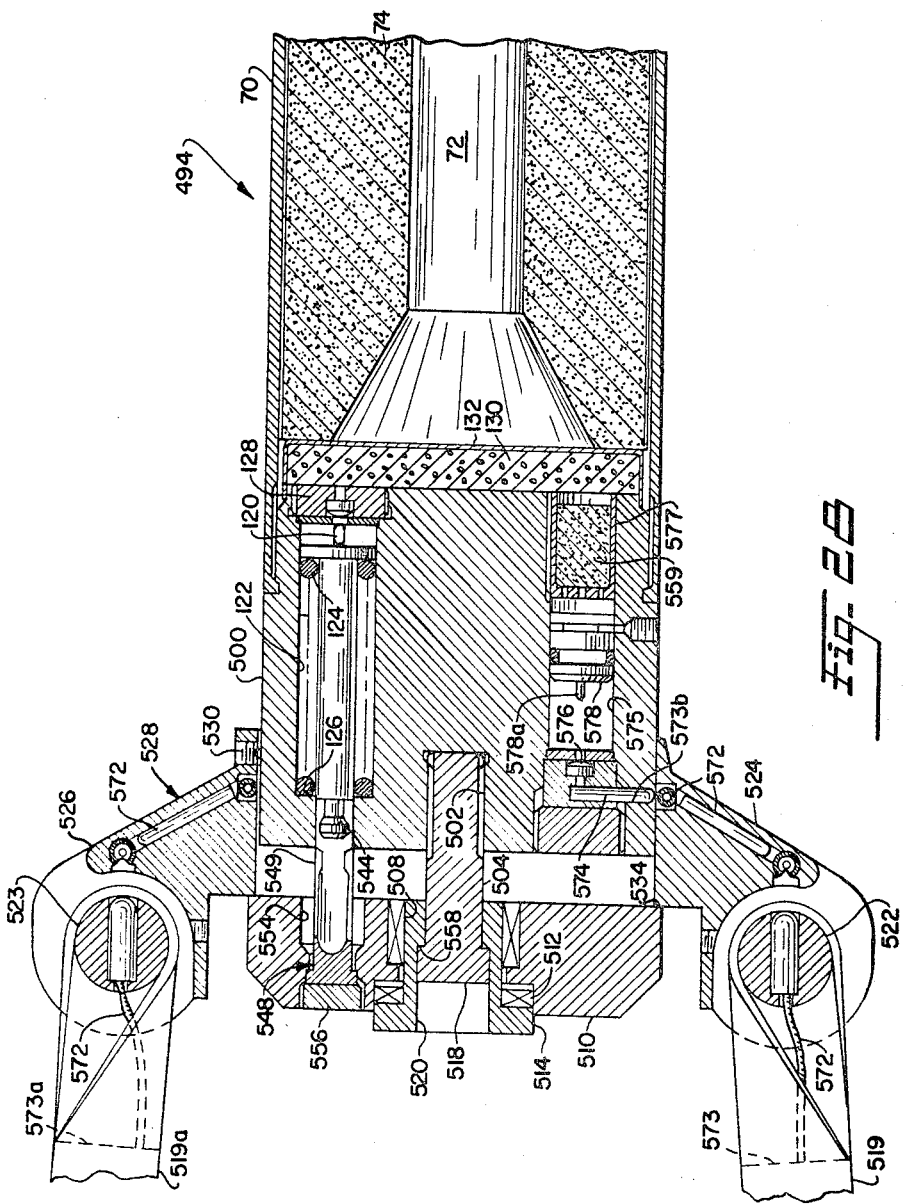

United States Patent Office 3,433,440
Patented Mar. 18, 1969

3,433,440
ERECTOR AND POSITIONING DEVICES FOR AIR CREW ESCAPE SYSTEM ROCKET
Robert M. Stanley, Denver, Colo., assignor to Stanley Aviation Corporation, Aurora, Colo., a corporation of New York
Continuation-in-part of application Ser. No. 390,709, Aug. 19, 1964. This application Dec. 9, 1966, Ser. No. 600,487
U.S. Cl. 244—137   41 Claims
Int. Cl. B64d 25/08; B64c 1/32

ABSTRACT OF THE DISCLOSURE

A rocket escape apparatus for removing an occupant from an air or space vehicle or the like wherein an escape rocket is stowed in the vehicle in a prone position and is erected to a launching position to initiate the escape. The rocket is connected by a flexible pendant line to the occupant to be removed. Launching of the rocket from its erected position and ignition of the rocket propellant tensions the rocket pendant line to extract the occupant from the vehicle.

---

This is a continuation-in-part of copending application Ser. No. 390,709 filed on Aug. 19, 1964, now abandoned, for Occupant Escape Apparatus for an Aircraft or the Like.

The invention herein relates to air crew escape apparatus and is particularly concerned with novel erector and positioning systems for an air crew escape rocket.

In the occupant escape system, described in Ser. No. 390,709, a tractor rocket, attached to the crew member's harness by a flexible rocket pendant line, provides the motive force for extracting the crew member from an air or space vehicle. The rocket is disclosed to be stowed in an erect launching position at a location which, for conventional aircraft, is usually limited to the rear of the occupant's seat.

To effect an escape with the system described in Ser. No. 390,709, the aircraft canopy is first jettisoned, and the rocket is then launched in unignited condition through the hatch opening. Unignited flight of the rocket away from the vehicle tensions the rocket pendant line to automatically ignite the rocket propellant. Ignited flight of the rocket pulls the crew member a safe distance from the vehicle. To complete the escape sequence, the rocket is automatically released from the extracted crew member just prior to burn-out with the result that the rocket moves away from the crew member to allow a safe recovery by parachute.

With the foregoing rocket air crew escape system, it was found that best results for recovery are obtained by so varying rocket trajectory in accordance with the speed of the aircraft as to compensate for the variations in aerodynamic drag.

It therefore is a major object of this invention to provide a novel device for automatically controlling the launch position of the occupant escape rocket in accordance with the air speed of the vehicle in which the rocket is mounted.

More specifically, it is an object of this invention to provide a novel device for so positioning the occupant escape rocket that its trajectory angle with a horizontal plane is varied inversely with respect to the vehicle speed.

Another important object of this invention is to provide a novel rocket air crew escape system wherein the rocket is stowed in a prone position and is erected to a launching position to initiate the escape. According to this aspect of the invention, the occupant escape rocket may advantageously be stowed in its prone position beneath a canopy and behind the overturn and crewman's seat in such types of aircraft as the Navy A–IH/J. This arrangement advantageously minimizes the space needed for storing the escape rocket, as well as reducing the modifications of existing aircraft designs that are needed for equipping an aircraft with the escape system of this invention.

Still another important object of this invention is to provide a rocket air crew escape system with a novel device which combines the rocket erection and positioning features defined in the previous objects. This aspect of the present invention thus combines the advantages of stowing the rocket in a space-saving prone position and of controlling the angle at which the rocket is launched in accordance with the vehicle speed at the time the escape is initiated.

A further object of this invention is to provide a novel rocket air crew escape system wherein the rocket is raised from a stowed, prone position to an erect, launching position and is adapted, while being raised, to engage and flip the aircraft canopy upwardly and rearwardly, thereby assuring that it is jettisoned out of the rocket launching path and the crewman's escape path.

Conventionally, the forward end of the canopy is thrust upwardly in an emergency by small thrusters. The impulse is normally sufficient to raise the forward end of the canopy to a point above the windshield where the air stream catches the canopy and rotates it about its aft attachment. At low aircraft speeds, however, the impulse imparted to the canopy by the forward thrusters may not be sufficient to throw the canopy back over a top, dead-center position with the result that, in absence of a relatively high velocity air stream to catch it, the canopy may fall back to a position where it obstructs the rocket launching path and the occupant extraction path. This dangerous condition is avoided according to the present invention by so engaging the canopy with the rocket as the latter is being erected that the rocket pushes the canopy up and aft, thus ensuring that it is permanently removed from the rocket launching and occupant escape paths.

Still another object of this invention is to provide a novel rocket launcher which is especially adapted for use with crew escape systems.

Further objects of this invention will appear as the description proceeds in connection with the appended claims and annexed drawings wherein:

FIGURE 1 is a fragmentary side elevation of an aircraft containing the preferred embodiment of this invention and having the fuselage partially broken away to show interior details;

FIGURES 2, 3, 4, 5, 6, and 7, of which FIGURES 2–4, inclusive, are similar to FIGURE 1, illustrate the preferred sequence of steps for making an escape with the apparatus of this invention;

FIGURE 8 is a diagrammatic view showing the assembly of the escape rocket, its launcher, and the rocket erector in the stowed, prone position, the high speed launch position, and the low speed launch position;

FIGURE 9 is a generally diagrammatic view illustrating the controls for the escape apparatus of this invention;

FIGURE 10 is an enlarged, fragmentary, partially sectioned side view of the rocket erector shown in FIGURE 9;

FIGURE 12 is a section taken substantially along lines 12—12 of FIGURE 11;

FIGURE 14 is a section taken substantially along lines 14—14 of FIGURE 13;

FIGURE 15 is a section taken substantially along lines 15—15 of FIGURE 14;

FIGURE 19 is a section taken substantially along lines 19—19 of FIGURE 16;

FIGURE 20 is a fragmentary side elevation similar to FIGURE 1, but illustrating another embodiment of this invention;

FIGURE 21 is a section taken substantially along lines 21—21 of FIGURE 20;

FIGURE 22 is a partially sectioned, fragmentary, enlarged side view of the rocket erector shown in FIGURE 20;

FIGURE 25 is a fragmentary side elevation of an aircraft containing still another embodiment of this invention;

FIGURE 26 is an enlarged, longitudinal section of the forward end of the escape rocket assembly shown in FIGURE 25;

FIGURE 27 is a continuation of the longitudinal section shown in FIGURE 26 and illustrating the rearward end of the rocket assembly;

FIGURE 28 is a fragmentary section similar to that of FIGURES 26 and 27, but showing the parts of the rocket assembly in operating position for extracting the occupant from the aircraft; and FIGURE 29 is a schematic view of the control system for operating the apparatus illustrated in FIGURES 25-28.

Figure 11:
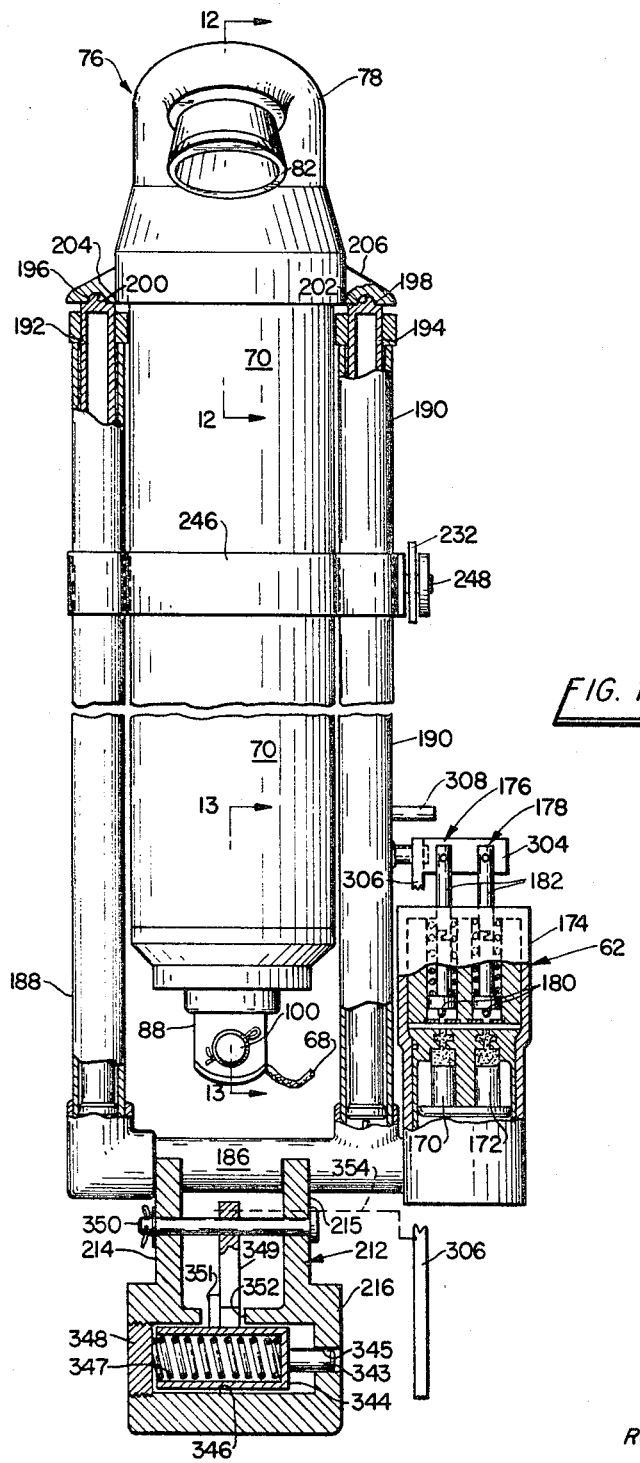
FIGURE 11 is a partially sectioned elevation of the escape rocket shown in FIGURES 1–9.

Although the present invention is described herein to be incorporated into an aircraft, it will readily be appreciated that it is equally applicable to numerous other forms of vehicles such as, for example, space vehicles, aerospace vehicles, aerial jeeps and the like. In addition, this invention may be applied to remove any load from any space.

Referring now to the drawings and more particularly to FIGURE 1, the reference numeral 30 generally designates an aircraft having a conventional, jettisonable canopy 32 for enclosing a cockpit 34. Mounted in cockpit 34 is a seat 36 which is adapted to accommodate the pilot or other occupant and which comprises a seat back 38 extending upwardly from a seat pan 40.

Canopy 32 is mounted on forward and aft guide tracks 42 and 44 for sliding movement between the illustrated hatch-closed position and a rearward, hatch-opened position. In its forward, hatch-closed position, canopy 32 extends over a cockpit bulkhead 46 and cockpit 34 and engages the rim of a windshield 48. In this position, canopy 32 cooperates with windshield 48 to enclose cockpit 34 as well as the space above bulkhead 46. Bulkhead 46 is behind seat 36 as shown.

Ingress and egress with respect to cockpit 34 is provided by sliding canopy 32 rearwardly to a position where its forward edge is disposed just to the rear of seat back 38. Suitable, releasable hold-down fittings 50 (one shown in FIGURE 1) secure canopy 32 in the forward position shown in FIGURE 1.

With the possible exception of seat 36, the aircraft construction thus far described is conventional and is essentially the same as the A-1H/J Navy airplane. Seat 36 may also be conventional, but it preferably is the same as the second embodiment described in Ser. No. 390,709.

Referring to FIGURE 9, the rocket escape system of this inventio ncomprises a tractor rocket 60, a rocket launching assembly 62, and a rocket erecting and positioning device 64. Rocket 60 is stowed in a prone position on bulkhead 46 and within the space enclosed by canopy 32 to the rear of seat 36. The aft end of rocket 60, as will be described in detail later on, is secured to the pilot's torso harness 66 by a towline 68. Device 64 is operable to erect rocket 60 to one of the two launching positions shown in FIGURE 8 depending upon the speed of the aircraft when the escape sequence is initiated. Concomitantly, canopy 32 is jettisoned. Assembly 62 then operates to launch rocket 60 in unignited condition through the hatch opening. The tension applied to towline 68 ignites the rocket propellant, and ignited flight of rocket 60 away from the aircraft pulls the man from cockpit 34. This escape sequence will be explained in greater detail later on.

As shown in FIGURES 11 and 12, rocket 60, which is generally the same as the occupant extraction rocket described in the first embodiment of Ser. No. 390,709, is provided with a tubular casing 70. Casing 70 defines a combustion chamber 72 for receiving a suitable gas-generating propellant indicated at 74. Mounted on casing 70 at the forward end of rocket 60 is a nozzle assembly 76 comprising a hollow nose cap housing 78 which mounts a pair of rearwardly and outwardly directed exhaust nozzles 80 and 82. Nozzles 80 and 82 are on diametrically opposed sides of housing 78 and respectively define gas venturi passages which communicate with chamber 72. The gas generated by burning the propellant stored in chamber 72 is exhausted through nozzles 80 and 82 to effectively pull rocket 60 through the air in tractor fashion. Preferably, nozzles 80 and 82 are so directed as to impart to rocket 60, during its ignited flight, a stabilizing spin in a predetermined direction about the rocket longitudinal axis.

Figure 13:
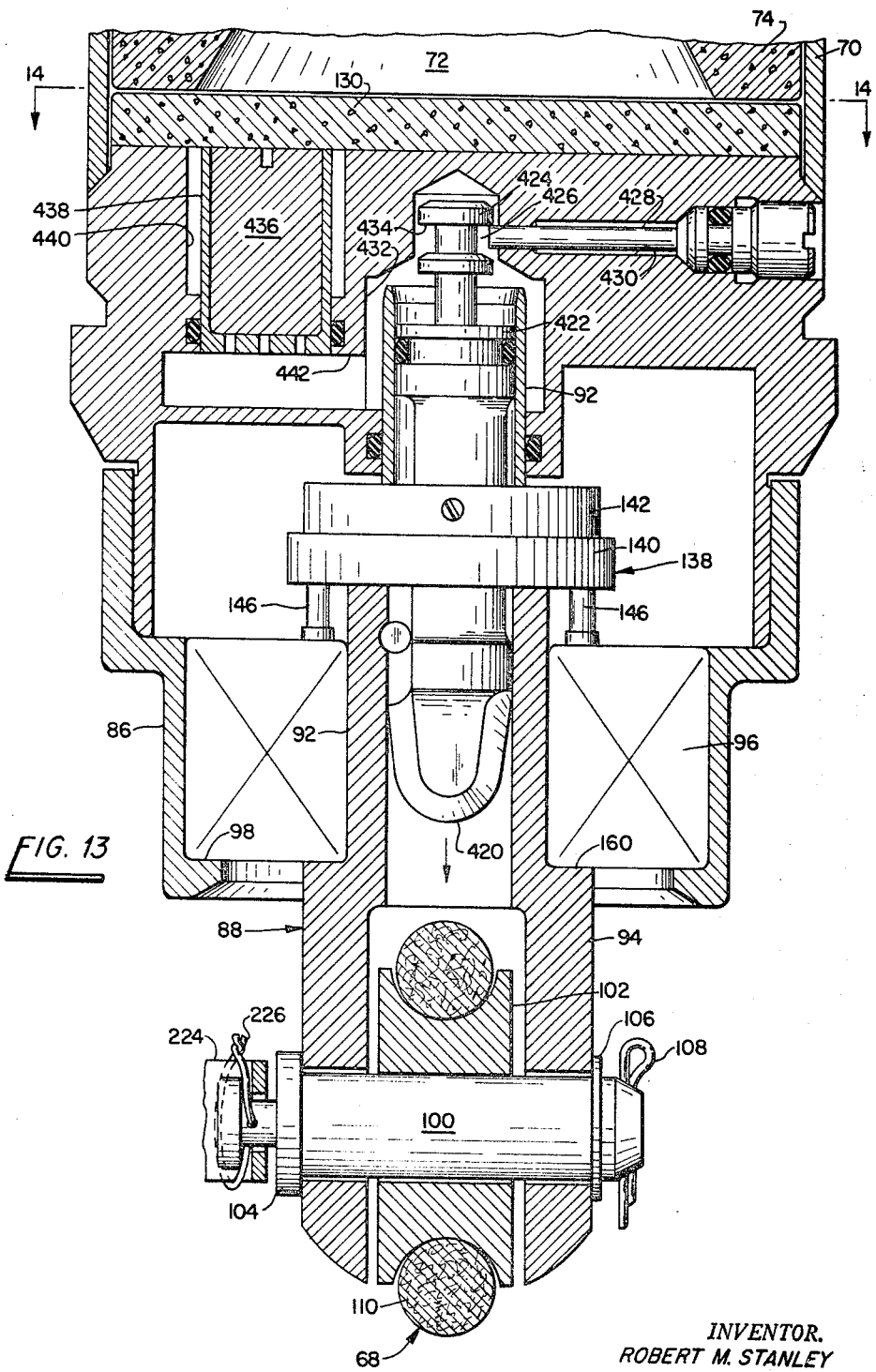
FIGURE 13 is a section taken substantially along lines 13—13 of FIGURE 11.

Referring now to FIGURES 13 and 15, a cylindrical, two-part extension housing 86 is rigidly fixed to the rearward end of casing 70 in axial alignment therewith. Housing 86 mounts a cylindrical swivel fitting 88 and a firing mechanism 90 (see FIGURE 15). As will be described in detail shortly, towline 68 is secured to swivel fitting 88, and firing mechanism 90 is actuated by tensioning towline 68 to ignite propellant 74.

Still referring to FIGURE 13, housing 86 is open at its rearward end to coaxially receive swivel fitting 88 which is integrally formed with a sleeve section 92 and a yoke section 94. Sleeve section 92 is journalled in housing 86 by an antifriction radial and thrust bearing assembly 96. Bearing assembly 96 is seated on a lower radial lip 98 which is formed integral with housing 86. Yoke section 94 projects beyond the rearward end of housing 86 and is formed with a pair of parallel spaced apart arms which are integrally joined together at the juncture with sleeve section 92. A stub shaft 100, rotatably extending through aligned bores in the arms of yoke section 94, mounts a pulley 102.

Pulley 102, which is disposed between the arms of yoke section 94, is medially intersected by the longitudinal axis of rocket 60 and is rotatable about an axis normally intersecting the rocket longitudinal axis. Shaft 100 is formed with a radial abutment shoulder 104 which is adapted to limit axial displacement of shaft 100 towards the right as viewed from FIGURE 13. The opposite end of shaft 100 mounts a washer 106 and a cotter pin 108. Axial displacement of shaft 100 is thus confined between shoulder 104 and washer 106. Towline 68 is formed with a looped end 110 which is trained around pulley 102.

The opposite end of towline 68, as shown in FIGURE 9, is in the form of a bridle which is secured to pendant disconnect fittings 112 and 114. Fittings 112 and 114 in turn are secured to torso harness 66 on opposite sides of the man's head. Ignited flight of rocket 60 away from the aircraft thus tensions towline 68 to extract the man from cockpit 34. The extracted man is free to swing about the rotational axis of shaft 100 and also to turn about the longitudinal axis of sleeve section 92 to prevent the towline bridle from becoming twisted or entangled.

Referring to FIGURE 15, firing mechanism 90 comprises a firing pin 120 which is slidably and coaxially received in a stepped, smooth-walled bore 122. Bore 122 is formed in housing 86 along an axis that is parallel to but laterally offset from the longitudinal axis of rocket 60. A coiled, helical spring 124 surrounding a reduced diametered shank portion of firing pin 120 reacts against a radial shoulder 126 in bore 122 to bias firing pin 120 forwardly to strike a primer 128. Primer 128 is seated against the underside of a rocket ignition charge 130 which is contained in a cup 132. Cup 132 is mounted in the rearward end of casing 70 below propellant 74. By striking primer 128, charge 130 is ignited. Ignition of charge 130 ignites propellant 74.

To releasably retain firing pin 120 in its cocked position shown in FIGURE 15, the shank portion of pin 120 extends rearwardly of shoulder 126 and is formed with a peripheral, radially outwardly opening groove 134 which aligns with a smooth walled bore 136. A ball 148 displaceably received in bore 136 seats in groove 134 to releasably lock firing pin 120 in its retracted, cocked position against the bias exerted by spring 124. Bore 136 extends radially between the shank portion of firing pin 120 and a collar 138. As shown, collar 138 is stepped to provide a lower, enlarged diametered section 140 and an upper reduced diametered section 142. When collar 138 is supported on flanges 144 of pins 146, the enlarged section 140 radially aligns with and blocks the inner end of bore 136. The diameter of ball 148 is made sufficiently large relative to the length of bore 136 that collar section 140 prevents ball 148 from being forced out of groove 134 by spring 124.

As best shown in FIGURE 15, the inner end of sleeve section 92 extending axially beyond bearing assembly 96 is formed with a reduced diametered portion 150. Collar 138 is suitably fixed on portion 150 and axially abuts against a radially extending shoulder 152 on sleeve section 92.

In the unlaunched positions of rocket parts shown in FIGURES 13 and 15, collar 138 is spaced axially inwardly of bearing assembly 96 by pins 146. Pins 146 are seated on the inwardly facing end of bearing assembly 96 and slidably extend into smooth walled, stepped bores 154 which are formed axially through collar 138. A downwardly facing shoulder 156 formed between stepped sections in each bore 154 seats on flange 144.

Still referring to FIGURES 13 and 15, a radial shoulder 160 formed on swivel fitting 88 at the junction between yoke section 94 and sleeve section 92 is seated against the downwardly facing side of bearing assembly 96. Swivel fitting 88 is thus confined against axial displacement by abutment of shoulder 160 and pins 146 with the oppositely facing surfaces of bearing assembly 96 prior to the launching of rocket 60 from the aircraft.

When rocket 60 is launched, the tension applied through towline 68 shears off flanges 144 on pins 146 and pulls the sub-assembly of swivel fitting 88 and collar 138 axially downwardly to a position where collar 138 seats on bearing assembly 96. This movement displaces the reduced diametered collar section 142 into radial alignment with the inner end of bore 136. The periphery of collar section 142 is spaced radially from the inner end of bore 136 by a sufficient distance to allow the bias exerted by spring 124 to urge ball 148 out of groove 134 and into bore 136 where it clears the periphery of the firing pin shank portion. As a result, firing pin 120 is released to be urged upwardly to strike primer 128 and thereby ignite charge 130. Ignition of charge 130, as previously explained, ignites the main body of rocket propellant. Thus, it is clear that rocket 60 is launched from the aircraft in an unignited condition and is ignited by the tensioning of towline 68 which is payed out during the unignited rocket flight away from the aircraft.

A second unshown firing mechanism of the same construction as mechanism 90 preferably is mounted in housing 86 to fire a further primer indicated at 162 in FIGURE 14. This unshown firing mechanism is releasably locked in its cocked position and by the same structure described for mechanism 90 and is actuated simultaneously with firing mechanism 90 to assure ignition of charge 130. In this embodiment, a force of about 900 to 1000 pounds is required to be exerted through towline 68 for shearing off flanges 144 to shift collar 138 downwardly to its position where firing pin 120 is released for detonating primer 128. Towline 68 may be fabricated from any suitable material such as nylon and is about 10 feet long.

The foregoing firing pin mechanism, the releasable ball lock, collar and swivel fitting construction is the same as that described in copending application Serial No. 502,890 filed on Oct. 23, 1965 for Catapult-Assisted Tractor Rocket Escape System and assigned to the assignee of this invention. In place of this structure, it will be appreciated that the corresponding structure disclosed in Ser. No. 390,709 and performing the same function may be used.

The rocket launching assembly 62 is shown in FIGURE 11 to comprise a pair of conventional primer and cartridge assemblies 170 and 172 which are mounted in a housing 174 and which are ignited by firing mechanisms 176 and 178.

Mechanisms 176 and 178 are preferably the same as the rocket launching firing mechanisms described in Ser. No. 390,709, each mechanism having a spring biased firing pin 180 which is held in a retracted, cocked position by a disconnect pin 182. When the disconnect pins 182 are pulled out of housing 174, firing pins 180 are freed for spring biased advancement to strike and ignite cartridge assemblies 170 and 172. Reference to Ser. No. 390,709 is made in the event that further details of firing mechanisms 176 and 178 are needed for complete understanding of this invention.

As shown in FIGURE 11, the expanding gases generated by ignition of cartridge assemblies 170 and 172 pass through a rigid conduit structure 186 and into a pair of rigid launching tubes 188 and 190. Housing 174 is mounted on conduit structure 186.

Tubes 188 and 190 are securely threaded at their rearward ends into conduit structure 186 and extend forwardly in parallel relation with the longitudinal axis of rocket 60 on diametrically opposite sides of casing 70. Rocket-launching, tubular push rods 192 and 194 slidably and coaxially received in lauching tubes 188 and 190 respectively project beyond the forward ends of tubes 188 and 190 and terminate at their forward ends in fittings 196 and 198. Fittings 196 and 198 are respectively separably seated in sockets 200 and 202 which are formed in radially extending arms 204 and 206. Arms 204 and 206 are integral with housing 78 at the forward end of the rocket.

The expanding, cartridge-generated gases flowing into launching tubes 188 and 190 eject push rods 192 and 194 for launching rocket 60 from the aircraft. Reference is made to Ser. No. 390,709 in the event that further details of the dual unit push rod launching structure described above is desired.

Figure 16:
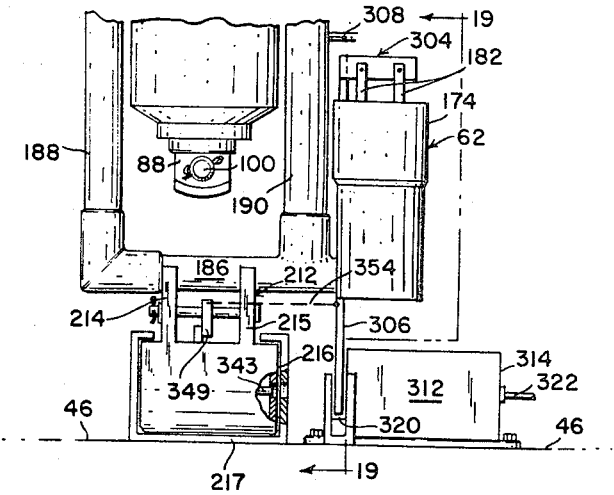
FIGURE 16 is a section taken substantially along lines 16—16 of FIGURE 1.

As shown in FIGURES 11 and 16, a launcher support and guide slide 212 is formed with a pair of parallel ears 214 and 215 which are suitably fixed to conduit structure 186. Ears 214 and 215 extend radially from a semi-cylindrical section 216 which forms a part of slide 212 and which is slidably received in a guide track 217. Guide track 217 comprises an upwardly opening U-shaped member which is securely fixed to bulkhead 46 and which extends in parallel relation with the longitudinal axis of the aircraft. Slide 212 is rockable about the axis of section 216 which extends perpendicularly with respect to the longitudinal axis of the rocket.

From the foregoing description, it will be appreciated that launcher assembly 62, which comprises firing mechanisms 176 and 178, conduit structure 186, launching tubes 188 and 190 and push rods 192 and 194, is mounted on slide 212 which can be linearly advanced along track 217 and simultaneously rotated about the axis of section 216. Rocket 60, in turn, is mounted on push rods 192 and 194 by fittings 196 and 198. This construction thus enables rocket 60 and launcher assembly 62 to be advanced as a single unit towards cockpit 34 along the straight path defined by track 217 as well as enabling rotational movement of rocket 60 and launcher assembly 62 about the longitudinal axis of section 216. Concomitant rotational and translational movement of rocket 60, according to this preferred embodiment of the invention, locates the rocket in one of its erect, launching positions shown in FIGURE 8.

The lower end of rocket 60, as best shown in FIGURE 13, may releasably be held in place relative to conduit structure 186 by a bracket 224 and a locking wire 226. Locking wire 226 is twisted around shaft 100 and bracket 224. Bracket 224 is suitably fixed to conduit structure 186.

Referring again to FIGURE 9, the rocket erecting device 64 supports rocket 60 near its forward end and comprises a cartridge-powered actuator 230 and a guide arm 232. Actuator 230 comprises a cylinder 234 which is pivotally mounted at its lower end on the aircraft framework by any suitable means such as a pin 236.

With continued reference to FIGURE 9, the pivot axis about which cylinder 234 is swingable extends normal to track 217 and to the longitudinal axis of rocket 60. The cylinder pivot axis is laterally offset from the longitudinal axis of rocket 60 when the latter is in its prone position and is located below and somewhat forwardly of the forward end of the rocket. The longitudinal axis of cylinder 234 and the pivot axis along pin 236 are mutally perpendicular. A piston 238 (see FIGURE 10) slidably received in cylinder 234 is rigidly fixed to a piston rod 240 which extends coaxially through the upper end of cylinder 234. The outer end of piston rod 240 is pivotally connected to an intermediate portion of guide arm 232 by a pin 244.

Guide arm 232 is pivotally connected at one end to a rigid bracket 246 by a pin 248. Bracket 246 is securely fixed by any suitable means to launching tubes 188 and 190. The opposite end of guide arm 232 is pivotally connected by a pin 250 to a bracket 252. Bracket 252 is fixed to the framework of the aircraft. The axes of pins 244, 248, and 250 are all parallel with the axis of pin 236. The forward ends of tubes 188 and 190 are held in parallel relation by bracket 246.

To extend piston rod 240 for erecting rocket 60 to one of its launching positions, a pair of firing mechanisms 260 and 262, as shown in FIGURE 9, are simultaneously actuatable to ignite cartridges 264 and 266. Firing mechanisms 260 and 262 may be of the same construction as mechanisms 176 and 178. Accordingly, like reference numerals suffixed by the letter *a* have been applied to designate the parts of mechanisms 260 and 262.

Cartridges 264 and 266 are respectively connected by ballistic gas lines 268 and 270 to cylinder 234. The gases generated by igniting cartridges 264 and 266 thus enter cylinder 234 and urge piston 238 and rod 240 upwardly to swing rocket 60 towards an erect launching position. The translational and rotational movement imparted to rocket 60 by actuator 230 will be explained in detail later on.

It will be appreciated that actuator 230, instead of being cartridge powered, may be pneumatically or hydraulically powered.

To actuate firing mechanisms 260 and 262, a firing control handle 272, which is shown in FIGURE 9, is mounted in cockpit 34 and is connected by a motion transmitting cable 274 to a pulley in a pulley and cable disconnect assembly 276. Assembly 276 has a further pulley section connected by a motion transmitting cable 278 to a bracket 280. Bracket 280 is fixed on a shaft 282 which is rotatably mounted on the rearward side of seat back 38. Shaft 282 is operatively connected to firing mechanisms 260 and 262 by a motion transmitting linkage assembly 284 which will be described shortly.

As shown in FIGURE 9, a detent lock 285 is provided for releasable retaining control handle 272 in its inoperative position. Lock 285 and pulley and cable disconnect assembly 276 are of conventional construction.

By pulling control handle 272, cable 274 is pulled in the direction of the arrow seen in FIGURE 9. This cable motion is transmitted through assembly 276 to pull cable 278 in the direction of the illustrated arrow. Pulling cable 278 rotates shaft 282 in the direction of the shown arrow, and rotation of shaft 282 is transmitted by linkage assembly 284 to simultaneously actuate firing mechanisms 260 and 262.

Still referring to FIGURE 9, linkage assembly 284 comprises an arm 286 which is fixed at one end to shaft 282 and which is pivotally connected at its other end to one end of a link 288. The other end of link 288 is pivotally connected to a link 290 which, in turn, is pivotally mounted on the framework of the seat back. A lever structure 292 connected to link 288 is pivotally connected to corresponding ends of two additional links 294 and 296. The opposite ends of links 294 and 296 are pivotally connected to disconnect pins 182a of firing mechanisms 260 and 262. Links 288, 290, 294, and 296 and lever structure 292 all form a part of assembly 284.

When shaft 282 is rotated in the direction of the arrow shown in FIGURE 9, therefore, arm 286 is swung upwardly to shift link 288 upwardly. Lever structure 292 is so connected to link 288 that upward displacement of the latter swings the former downwardly with the result that links 294 and 296 are displaced downwardly to pull disconnect pins 182a out of the firing mechanism housing. Firing pins 180a of mechanisms 260 and 262 are thus released to ignite cartridges 264 and 266. It will be appreciated that any suitable linkage may be used to transmit the cable motion resulting from pulling handle 272.

An overcenter spring 298 connected to bracket 280 normally biases shaft 282 against inadvertent movement in the direction shown by the arrow in FIGURE 9. When shaft 282 is rotated in the direction of the illustrated arrow by pulling control handle 272, the connection between spring 298 and bracket 280 moves through an overcenter position with the result that spring 298 will then urge shaft 282 in the direction of the arrow.

Referring to FIGURE 8, the stowed positions of rocket 60, launcher assembly 62, actuator 230, and guide arm 232 are shown in solid lines. The superimposed dashed lines and chain-linked lines respectively show the low speed launching positions and the high speed launching positions of these parts. When expanding, cartridge-generated gas or other motive fluid is introduced into cylinder 234, piston rod 240 is extended to swing guide arm 232 upwardly about the axis of pin 250, thereby rotating the forward end of rocket 60 upwardly and rearwardly in a counterclockwise direction as viewed from FIGURES 1, 8 and 9. Since the length of guide arm 232 is fixed between pins 248 and 250, the guide arm will pull rocket 60 together with launcher assembly 62 forwardly along track 217 as it is rotated in a clockwise direction about the axis of pin 250. Thus, translational or linear movement is imparted to rocket 60 and launcher assembly 62 in a plane extending parallel with the rocket longitudinal axis simultaneously with rotational movement of these parts about the axis of slide section 216, which as previously described, extends at right angles to the rocket longitudinal axis. Rotational displacement of rocket 60 and launcher assembly 62 provides the rocket with the desired trajectory angle for launching. The linear or translational advancement of rocket 60 positions it more closely to the man to improve the dynamic behavior of the escape system particularly at low aircraft speeds.

Figure 17:
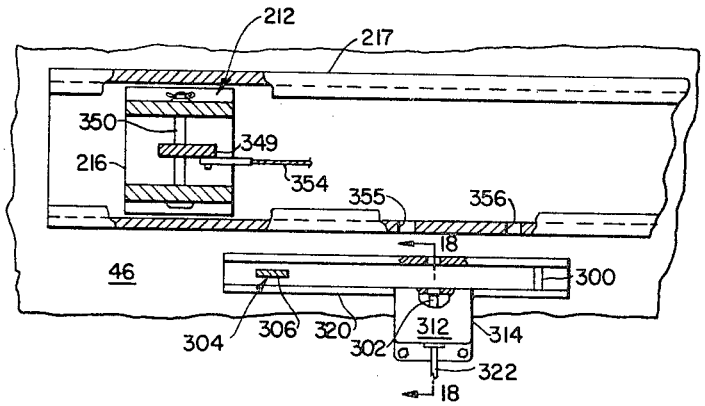
FIGURE 17 is a section taken substantially along lines 17—17 of FIGURE 1.

In further accordance with this invention, rocket 60 is automatically positioned and launched from the aircraft by providing a fixed stop 300 and a movable stop 302 as shown in FIGURE 17. Stop 300 is in the form of a cylindrical pin and is fixed to bulkhead 46 in a path of a launcher firing lever 304.

Figure 18:
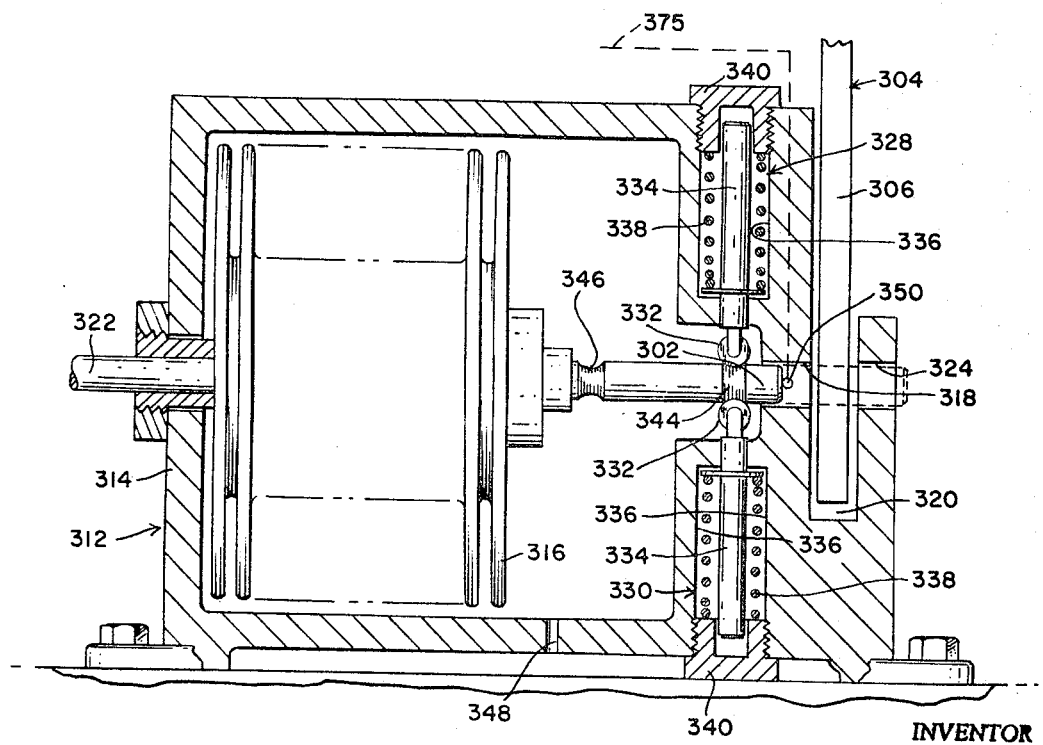
FIGURE 18 is a section taken substantially along lines 18—18 of FIGURE 17.

Referring to FIGURES 11 and 16, lever 304 is connected to the disconnect pins 182 of firing mechanisms 176 and 178 and, as shown in FIGURES 17 and 18, has a downwardly extending section 306 which moves along a path that is parallel to track 217 as rocket 60 is erected by actuator 230. Stop 300 is so located that it will be engaged by lever section 306 when rocket 60 reaches its erected, launching position for low aircraft speeds. As best shown in FIGURE 19, lever 304 is pivotally mounted by a pin 307 on any suitable relatively stationary part of assembly 62 such as launching tube 190. The axis of pin 307 is normal to the longitudinal axis of rocket 60.

When lever section 306 engages stop 300, lever 304 is tripped to outwardly pull pins 182 sufficiently far that they become disconnected from firing pins 180 allowing the latter, under the bias of their coiled springs, to be advanced for striking the primers of cartridges 170 and 172. Cartridges 170 and 172 are thereby fired to launch rocket 60. The stroke time for moving rocket 60 and launcher assembly 62 to the erect, low or high speed launch positions is essentially within 0.4 second after initiation of rocket erection by actuator 230.

A stop member 308, as shown in FIGURE 19, is fixed to launching tube 190 to limit the clockwise pivotal movement of lever 304 which results from engaging lever section 306 with stop 300. Stop member 308 is spaced from lever section 306 to allow lever 304 to be pivoted far enough by engagement with stop 300 to actuate firing mechanisms 176 and 178. Engagement of lever section 306 with stop member 308 prevents section 306 from clearing stop 300.

Stop 302 is shown in FIGURES 17 and 18 to be in the form of a cylindrical pin which is axially moved into and out of the path of lever section 306 by an aneroid speed sensing device 312. Device 312 comprises a hollow housing 314 in which a corrugated, aneroid bellows 316 is mounted for expansion and contraction along an axis aligning with that of stop 302. Stop 302 is suitably secured to one end of bellows 316 and slidably extends through an aperture 318 which is formed in housing 314. The aligned axes of bellows 316 and stop 302 extend at right angles to track 217. Housing 314 is fixed to bulkhead 46.

In this embodiment, housing 314 is integrally formed with an upwardly opening channel 320 extending parallel with guide track 217 and slidably receiving the lower end of lever section 306 for guiding the movement of lever 304 as rocket 60 and launcher assembly 62 are being erected. Stop 300 may be mounted on channel 320 in parallel with stop 302 as shown.

A conduit 322, as shown in FIGURE 18, establishes fluid communication between the interior of bellows 316 and the exterior of the aircraft. Bellows 316 thus senses dynamic pressure and will axially expand and contract as the speed of the aircraft respectively increases and decreases. Expansion of bellows 316 from the positions of parts shown in FIGURE 18 axially advances stop 302 through aperture 318, perpendicularly across channel 320, and into an aligning aperture 324 which is formed in the opposite channel side wall. This extended position of stop 302 is shown in phantom lines in FIGURE 18.

As best shown in FIGURE 17, stop 302 is located a predetermined distance rearwardly of stop 300 so that when it is extended, it will trip lever 304 when rocket 60 reaches its high speed launching position shown in FIGURE 8. Engagement of lever section 306 with stop 302 pivots lever 304 into engagement with stop member 308 to prevent lever 304 from advancing beyond the stop.

At low speeds, for example, zero to 300 knots, bellows 316 is adapted to hold stop 302 in its withdrawn position as shown in FIGURES 17 and 18. When rocket 60 is erected, therefore, lever section 306 will move past stop 302 and will be tripped by stop 300. Since stop 300 is located forwardly of stop 302 the acute angle that the longitudinal axis of the erected rocket makes with the horizontal is greater than the acute angle between the rocket axis and the horizontal when stop 302 is extended.

The difference between the two rocket launching angles as determined by the locations of stops 300 and 302 is calculated to vary the forward component of the rocket launch velocity to compensate for the variation in aerodynamic drag as determined by the aircraft speed at the time an escape is initiated. At high aircraft speeds such as, for example, 300 knots or more, the incline of the rocket axis is at a lesser angle with the horizontal to compensate for the increased aerodynamic drag. At lower aircraft speeds, the rocket launching angle is increased owing to the reduced drag. By varying the rocket launching angle in this manner, the forward component of the rocket launch velocity is increased and decreased correspondingly with the aircraft speed and thus with the aerodynamic drag at the time an escape is initiated. In the prone, stowed position of rocket 60, the acute angle between the rocket longitudinal axis and the horizontal is comparatively small and is appreciably less than the high speed rocket launching angle.

As shown in FIGURE 18, the aneroid device 312 has a pair of spring biased detent assemblies 328 and 330 which provide stop 302 with a positive action so that it will either be fully extended or fully retracted. Assembly 328 comprises a roller 332 which is carried by a cylindrical plunger 334 and which is adapted to axially ride along the periphery of stop 302 in housing 314. Plunger 334 slidably and coaxially extends into a stepped bore 336 which is formed in housing 314 along a radial axis that normally intersects the longitudinl axis of stop 302. A coiled spring 338 peripherally surrounding plunger 334 and received in an enlarged section of bore 336 reacts against a plug 340 to bias the assembly of plunger 334 and roller 332 radially towards stop 302. Plug 340 is threaded into housing 314.

Assembly 330 is diametrically opposite assembly 328 and is of the same construction as assembly 328, like reference numerals being applied to designate like parts.

Still referring to FIGURE 18, stop 302 is formed with two axially spaced, outwardly opening grooves 344 and 346. When stop 302 is in its retracted position, rollers 332 of assemblies 328 and 330 seat in groove 344 to releasably retain stop 302 against inadvertent axial displacement. As stop 302 is extended by expansion of bellows 316, rollers 332 ride out of groove 344 and seat in groove 346 when the stop reaches its fully extended, lever tripping position shown in phantom lines in FIGURE 18. Engagement of rollers 332 in groove 346 arrests axial advancement of stop 302 and releasably retains it in its fully extended position.

A vent hole 348 formed through housing 314 maintains pressure within the housing at atmospheric conditions.

Advantageously, an arming pin 350 (see FIGURE 18) may be mounted in housing 314 to hold stop 302 in its retracted position until erection of rocket 60 is initiated. At this time, pin 350 is pulled out of the path of stop 302 by means to be described later on to allow bellows 316 to extend stop 302 to its lever tripping position.

Although this embodiment of the invention provides for only two rocket launching positions, it will be appreciated that additional launching positions for various ranges of aircraft speeds can be obtained by providing additional aneroid sensors having movable, lever tripping stops spaced along the linear path of rocket movement during erection.

To lock rocket 60 and launcher assembly 62 in either of the low or high speed launch positions, a cylindrical latch pin 343 is shown in FIGURE 11 to be rigidly fixed to the closed end of a well 344. Pin 343 axially aligns with well 344 and slidably extends into a bore 345 which is formed through an end wall of slide 212. Well 344 is coaxially and slidably received in a cylindrical recess 346 which is also formed in slide 212. The axes of pin 343, well 344, bore 345 and recess 346 are substantially parallel with the longitudinal axis of section 216. Pin 343 is thus slidable through bore 345 along an axis extending at right angles to track 217.

Still referring to FIGURE 11, a coiled, helical spring 347 coaxially received in well 344 bears against the closed end of the well and reacts against a plug 348 to axially bias pin 343 to the right. Plug 348 is threaded into slide 212. A latch release lever 349, which is mounted on a support pin 350, is adapted to engage a pin member 351 for releasably retaining pin 343 in its illustrated, retracted position. Pin member 351 is suitably fixed to well 344 and extends radially through a longitudinal slot 352 which is formed in section 216. Support pin 350 rotatably extends through aligned apertures in ears 214 and 215 and is confined against axial movement.

Lever 349 is connected by a suitable motion transmitting linkage 354 to lever 306. The axis of pin 350 is parallel with that of pin 343. When lever 306 is tripped by engagement with stop 300 or stop 302, the resulting pivotal movement is transmitted by linkage 354 to swing lever 349 about the axis of support pin 350 and out of latching engagement with pin member 351. Spring 347 is thereby freed to bias latch pin 343 to the right as viewed from FIGURE 16.

Under the biasing force exerted by spring 347, latch pin 343 is adapted to be extended into either one of two latching apertures 355 and 356 (see FIGURE 17) depending upon the position at which lever 306 is tripped. Apertures 355 and 356 are formed in one of the side walls of track 217 and are longitudinally spaced apart to axially align with bore 345 when slide 212 and, consequently, the assembly of rocket 60 and the rocket launcher respectively reaches its high and low speed launch positions.

If stop 302 is extended to trip lever 306, lever 349 will be pivoted in time to release latch pin 343 for extension into aperture 355. If stop 302 is retracted and lever 306 is tripped by stop 300, pin 343 is held in its retracted position as it passes aperture 355 and is thereafter released by pivotal displacement of lever 349 to extend into aperture 356. The engagement of pin 343 within aperture 355 or aperture 356 prevents further rotational or translational displacement from being imparted to the rocket and its launcher assembly by actuator 230. As a result, rocket 60 and launcher assembly 62 will be locked in either the high speed launch position or the low speed launch position depending upon which of the apertures 355 and 356 pin 343 is extended into. The pressure of gases in cylinder 234 holds the assembly of rocket 60 and its launcher in either of the erected launch positions.

Advantageously, a pin 357 (see FIGURE 10) is provided to releasably latch rocket 60 and launcher assembly 62 in their prone, stowed positions. Pin 357 has a section threaded into cylinder 234 and terminates in a shearable post 358 which protrudes radially into the piston chamber. As shown, piston 238 is axially confined between post 358 and an internal cylinder shoulder 359 to retain the assembly of rocket 60 and its launcher in its prone position by preventing inadvertent motion from being imparted through arm 232. When cartridges 264 and 266 are ignited sufficient pressure is applied to piston 238 to shear off post 358, thereby allowing the piston to advance upwardly for erecting the rocket.

When seat 36 is of the folding type described in application Ser. No. 390,709, pan 40 is pivotally secured to the seat back and is held in its horizontal position by struts 360 (one shown in FIGURE 9) which are engaged by hook portions of trip levers 362 (one shown). Levers 362 are mounted on shaft 282. A seat supporting and adjusting mechanism 364 is releasably connected to shaft 282 by a fitting 366 to secure seat 36 in its normal position.

When rocket 60 is launched and ignited, seat 36 is adapted to be pulled upwardly a limited distance along two parallel guide rails 367 (one shown in FIGURE 1) by the upward rocket thrust which is transmitted through towline 68, the occupant's torso harness 66, and the usual restraint straps which are indicated at 368 in FIGURE 9. Levers 362 disengage from struts 360 when shaft 282 is rotated by pulling handle 272. When upward displacement is imparted to seat 36 by rocket 60, therefore, pan 40 pivots downwardly about its attachment to back 38. As a result, back 38 and pan 40 form a chute to straighten the occupants posture as he is being extracted by rocket 60.

When the man occupying seat 36 pulls control handle 272 to initiate an escape, shaft 282 is rotated to actuate firing mechanisms 260 and 262. As a result, a ballistic command signal is almost immediately transmitted to actuator 230 to start the erection of rocket 60 and its launcher. The initial motion imparted to piston 238 is transmitted to close a canopy jettisoning switch 371 (see FIGURE 9) by a suitable linkage schematically indicated at 372. Switch 371 is contained in an electrical circuit for actuating a series of canopy jettisoning thrusters 374. By closing switch 371, a circuit is completed to actuate thrusters 374. Thrusters 374 and the thruster actuating circuit are conventional.

When actuated, thrusters 374 impart an upward impulse to the canopy to raise the forward end thereof to a point above windshield 48 where the airstream catches the canopy and rotates it upwardly and rearwardly about its aft attachment to the aircraft. This clears the path for launching rocket 60 and extracting the pilot. The jettisoning of canopy 32 should occur immediately prior to or simultaneously with rocket-canopy contact (see FIGURE 2).

At low air speeds where the airstream may not impart sufficient force to flip canopy 32 up and aft, there is a danger that the impulses from thrusters 374 or other conventional release and jettisoning devices may not be sufficient to throw the canopy back over a top, dead-center position. If this condition occurs and is not corrected, the canopy would simply move up slightly and then fall back into a position where it would obstruct the rocket launch path.

In accordance with this invention, however, the forward end of rocket 60, as it is being erected, is adapted to contact the roof of canopy 32 in the region indicated at 382 in FIGURES 1, 2 and 3 to thereby push the canopy up and aft. The thrust of rocket erection is thus imparted to canopy 32 to ensure that it clears its top, dead-center position and is permanently removed from the rocket launch path and the pilot's extraction path as shown in FIGURE 3. As the erection of rocket 60 proceeds, the lightweight attachment structure at the aft end of the canopy will bend and tear, and the canopy will eventually achieve such a rotational and translational velocity that it will follow an acceptable trajectory after release of the rear attachment. If desired, a ballistic signal may be transmitted to a shaped charge at the proper stage of canopy removal for severing the remaining rear attachment to the aircraft.

The initial, rocket erecting displacement of piston rod 240 is transmitted by a suitable linkage 375 (FIGURE 9) to remove pin 350, thus releasing stop 302 for displacement by the sensing device 312. Continued erection of rocket 60 therefore trips lever 304 by engagement with either stop 300 or stop 302 depending upon the speed of the aircraft. By tripping lever 304, the rocket launch firing mechanisms 176 and 178 are actuated to fire cartridges 170 and 172.

The expanding gases generated by igniting cartridges 170 and 172 flow into launch tubes 188 and 190 to eject push rods 192 and 194. The eject force is applied to arms 204 and 206 to launch rocket 60 in its unignited condition from the aircraft as shown in FIGURE 4. When push rods 192 and 194 clear tubes 188 and 190, they disengage and separate from the rocket.

By launching rocket 60, towline 68 is pulled taut (see FIGURE 5) to release firing mechanism 90 for igniting the rocket propellant 74 in the manner previously described. Ignited flight of rocket 60 exerts an upward pull on the pilot in seat 36. This upward force is applied through the pilot's torso harness 66 and the lap and shoulder restraint straps to pull seat back 38 upwardly along guide rails 367 in the aircraft. It will be recalled that seat 36 was released from mechanism 364 for upward displacement when handle 272 was pulled to initiate the escape sequence.

As seat back 38 is pulled upwardly, pan 40 is pivoted about its rear attachment to back 38 to form the previously described chute for straightening the pilot's posture. At this stage, a lever 390 (see FIGURE 9), which is pivotally mounted on seat back 38, is engaged and tripped by a member 392. Member 392 is suitably fixed to a rigid part of the aircraft such as one of the guide rails for seat back 38.

Lever 390 is connected through a suitable motion transmitting linkage 394 to restraint strap release pins 396 and 397. Linkage 384 may be the same as that described in Ser. No. 390,709 and is shown herein to essentially comprise a lever member 398 fixed to lever 390 and pivotally connected to a rod 400. Rod 400 is pivotally connected to a pivotally mounted lever member 402 which in turn is pivotally connected to a pair of arms 404 and 406. Pins 396 and 397 are secured to arms 404 and 406 respectively.

When lever 390 engages and is tripped by member 392, it and lever member 398 are pivoted in the direction of the arrow shown in FIGURE 9. As a result, rod 400 is pulled in the direction of the illustrated arrow to pivot lever member 402 in a clockwise direction. Pivotal displacement of lever member 402 in this direction pulls arms 404 and 406 towards each other. This movement of arms 404 and 406 disengages pins 396 and 397 from fittings secured on the ends of restraint straps 368 to release straps 368 from the seat.

At the same time that restraint straps 368 are released, the unshown shoulder straps may be released by a standard inertia reel strap release mechanism 408 which is connected to a lever member 410 by a motion transmitting cable 412. Lever member 410 is secured to member 402. When lever 390 is tripped to pivot lever member 402, therefore, member 410 is also turned to actuate mechanism 408 for releasing the shoulder straps. The pilot, as shown in FIGURE 6, is now released from seat 36 and is pulled upwardly through the hatch opening by ignited flight of rocket 60 away from the aircraft.

To release the man from rocket 60 after he reaches a safe height, a towline cutter 420, as shown in FIGURE 13, is fixed to the rearward end of a piston 422 which is slidably received in sleeve section 92 of fitting 88. Piston 422 has an integral coaxial extension 424 which extends through and beyond the upper end of sleeve section 92. The upper protruding end of extension 424 is provided with an annular radially outwardly opening groove 426. A shear pin 428 is mounted in a transverse bore 430 and extends radially into groove 426. Bore 430 normally intersects a longitudinal bore 432 formed in housing 86. The upper ends of sleeve section 92 and extension 424 are freely received in the inner end of bore 432 as shown. A shoulder 434 formed on extension 424 is seated on the forward end of shear pin 428 to releasably retain cutter 420 in a retracted, inoperative position vertically above pulley 102.

In addition to igniting the main body of rocket propellant, charge 130 also ignites an auxiliary, cutter actuating, propellant charge 436 which is contained in an upwardly opening metal well 438 having an apertured bottom. Well 438 is mounted in a bore 440 which communicates at its lower end with the inner end of bore 432 through a cross passage 442.

Charge 436 is sized to burn out just prior to the burn out of propellant 74. As a result, the gases generated by burning the remaining portion of rocket propellant in chamber 72 flow through the apertured bottom of well 438 and through passage 442 into the inner end of bore 432. The expanding gases entering bore 432 apply pressure to the inner end of piston 422 to shear off the inner end of pin 428. Thus released, piston 422 and cutter 420 are downwardly ejected to a position where the knife edge on cutter 420 engages and severs the looped portion of towline 68 trained around pulley 102. The man is thus released from rocket 60 as shown in FIGURE 7. At this stage of the escape sequence, rocket 60 has sufficient propellant left to fly a sufficient distance away from the man to permit safe deployment of his recovery parachute.

The foregoing structure for cutting towline 68 is the same as that described in the aforesaid copending application Ser. No. 502,890. In place of this construction, it will be appreciated that the system described in Ser. No. 390,709 for severing towline 68 may be used.

In the embodiment shown in FIGURES 20–24, rocket 60 and its launcher are mounted only for pivotal movement from a prone, stowed position to either a high speed or low speed launch position. As shown in FIGURES 20 and 21, slide 212 and track 217 are replaced with a support rod 448 which is rigidly secured to conduit structure 186 by a plate member 449. Rod 448 rotatably extends through aligning apertures which are formed in parallel upstanding ears 450 and 452 of a rigid bracket 454. Bracket 454 is suitably fixed to the framework of the aircraft.

To pivot rocket 60 and its launcher about the axis of rod 448, piston rod 240 is pivotally connected directly to bracket 246. When cartridges 264 and 266 are ignited by actuating firing mechanisms 260 and 262, therefore, rod 240 is extended to rotate rocket 60 and its launcher upwardly and rearwardly about the axis of rod 448.

Referring now to FIGURE 22, a fixed stop 456 in the form of an internal cylinder shoulder is provided to arrest the erector motion at a position where rocket 60 is aimed for launching at low aircraft speeds. A movable stop 458 also is provided to arrest the erection of rocket 60 and its launcher at the more gradually inclined, launch position used at high aircraft speeds.

Stop 458 is secured to the bellows of an aneroid sensing device 460 which may be of the same construction as device 312. At low aircraft speeds stop 458, which is slidable in a radial bore formed in cylinder 234, is held in its illustrated retracted position by device 460. At high aircraft speeds, the bellows of device 460 expands to extend stop 458 into the piston-receiving cylinder bore. When extended, stop 458 limits the stroke of piston 238 to thus arrest erection of rocket 60 and its launcher at the more gradually inclined launch position.

Figure 23:
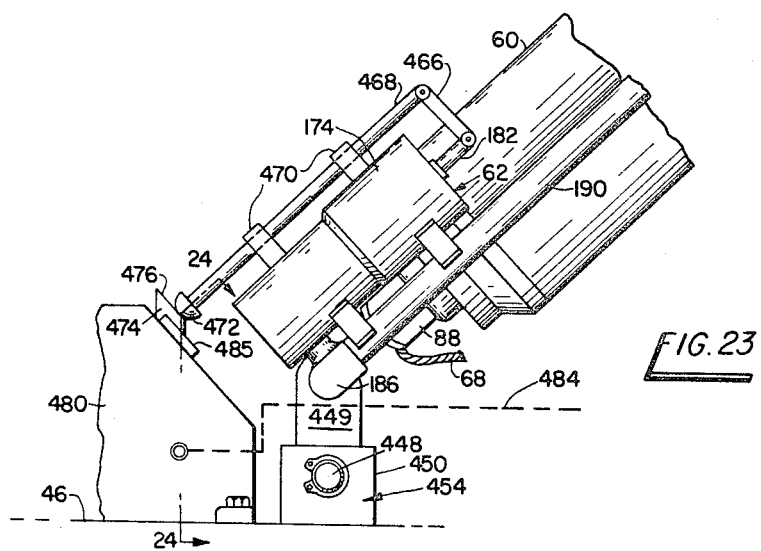
FIGURE 23 is an enlarged, fragmentary side elevation showing the rocket launching mechanism of FIGURE 20 in its erected, low-speed launch position.

Referring now to FIGURE 23, the rocket launching firing mechanism disconnect pins 182 are connected by a link 466 to a rod 468. Rod 468 is slidably mounted on suitable brackets 470 for longitudinal displacement parallel to the axes of pins 182. A shoe 472 is mounted on the lower end of rod 468. A block 474 has a ramp surface 476 which shoe 472 is adapted to engage as the assembly of rocket 60 and its launcher is advanced towards its high speed launch position.

Rod 468 is pushed progressively upwardly by engagement of shoe 472 with ramp surface 476 as the launcher assembly is rotated upwardly about the axis of rod 448. Upward displacement of rod 468 pulls the firing mechanism pins 182 in an upward direction. When rocket 60 reaches its high speed launch position (see FIGURE 20), pins 182 are pulled out sufficiently far to disengage from firing pins 180, thereby allowing the latter to be springbiased to their cartridge firing positions.

Figure 24:
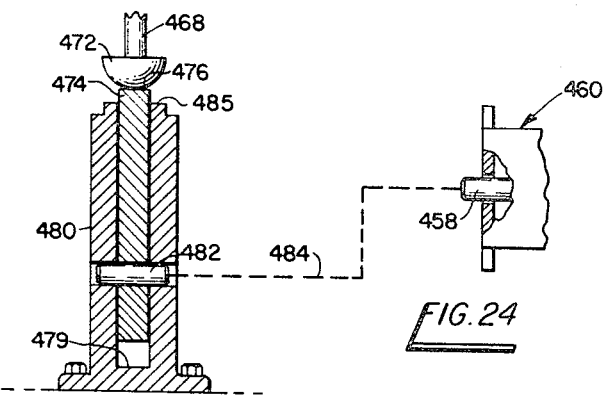
FIGURE 24 is a section taken substantially along lines 24—24 of FIGURE 23.

As best shown in FIGURE 24, block 474 is seated in an upwardly opening socket 479 which is formed in a rigid support housing 480. Housing 480 is suitably secured to the framework of the aircraft. A pin 482 extending through aligned bores in housing 480 and block 474, holds the latter in a raised position as shown in FIGURE 23. Pin 482 is connected by a suitable motion transmitting linkage 484 to pin 458.

When an escape is initiated at a high aircraft speed, pin 482 is held in its illustrated position to lock block 474 in its raised position shown in FIGURE 23. Under these conditions, device 460 operates to extend stop 458 for limiting the stroke of piston 283.

When an escape is initiated at a low aircraft speed, device 460 retracts stop 458 and withdraws pin 482, allowing block 474 to descend into socket 479, thereby lowering ramp surface 476 relative to shoe 472. As a result, shoe 472 will be rotated through a greater angle before it engages a ramp surface 485 which causes rod 468 to be raised for pulling pins 180 outwardly to positions where they disengage from firing pins 182.

In the embodiment shown in FIGURES 25–28, the escape rocket 494 in certain respects is similar to rocket 60, and to the extent that rockets 494 and 60 are the same, like reference numerals have been applied to designate like parts. As shown in FIGURE 27, a modified, cylindrical extension housing 500 snugly extends coaxially into the open aft end of casing 70 and has a coaxial, rearwardly opening tapped bore 502. Housing 500 is fixed to casing 70 by any suitable means. A mounting bolt 504 threaded in bore 502 extends rearwardly beyond housing 500 and mounts a bearing retainer sleeve 506. A bearing comprising a bushing 508 carried by sleeve 506 rotatably mounts an annular swivel fitting 510.

With continued reference to FIGURE 27, a thrust bearing 512 spaced axially rearwardly from bearing 508 is mounted on sleeve 506 and is axially retained between a radial flange 514 formed integral with the rearward end of sleeve 506 and the bottom wall of a rearwardly opening counterbored recess 516 formed coaxially in fitting 510. With this construction, swivel fitting 510 is axially retained between the rearwardly directed end face of housing 500 and flange 514 on sleeve 506.

With continued reference to FIGURE 27, bolt 504 is provided at its rearward end with an enlarged head 518 which is slidably received in an enlarged bore section 520 coaxially formed in sleeve 506. Sleeve 506 is axially slidable on bolt 504 between head 518 and the rearwardly directed end face of housing 500 for a purpose to be described shortly.

As shown in FIGURE 26, a pair of towlines 519 and 519a are respectively secured around pins 522 and 523 which, in turn, are respectively fixed to bifurcated, diametrically opposed, radially outwardly extending arms 524 and 526. Arms 524 and 526 are formed integral with a mounting collar 528 through which casing 70 slidably and coaxially extends. Towlines 519 and 519a are secured to fittings 112 and 114 on the pilot's torso harness.

When rocket 494 is stored in the cockpit of the aircraft, collar 528 is detachably secured to the upper end of the rocket by a specially constructed, threaded pin 530 having a small, shearable cylindrical post 531 extending into a blind, radial bore in nose cap housing 78. Collar 528 is also detachably secured to a launching tube 532 by threaded pins 533 which are of the same construction as pin 530. When rocket 494 is launched from the aircraft, collar 528 is axially displaced to the aft end of the rocket in a manner to be described shortly.

As shown in FIGURES 27 and 28, the diameter of swivel fitting 510 is slightly greater than the diameters of housing 500 and casing 70 to provide an axially facing marginal surface 534 on which collar 528 seats when it is axially shifted to the aft end of rocket 494. The outer diameters of casing 70 and housing 500 are the same to provide a continuous cylindrical surface along which collar 528 slides when pulled rearwardly from its stored position adjacent the forward end of rocket 494.

With continuing reference to FIGURE 27, the rearward end of firing pin 120 is formed with a knuckle 544 which is coaxially received in a spring tang lock 548 having a tubular section which is slotted to form fingers 549. Fingers 549 securely grip knuckle 544 to retain pin 120 in its rearwardly retracted, cocked position against the bias of spring 124.

Still referring to FIGURE 27, lock 548 extends rearwardly and coaxially through a stepped bore 554 formed in swivel fitting 510. At its rearward end, lock 548 terminates in an enlarged cylindrical section 556. Section 556 seats against a rearwardly directed internal annular shoulder formed in bore 554 to axially retain swivel fitting 510 in abutment with the rearwardly directed end face of housing 500 when rocket 494 is stored in the aircraft.

When rocket 494 is launched from the aircraft, collar 528 is shifted to its aft seating position on fitting 510 so that the tension applied through towlines 519 and 519a displaces swivel fitting 510 and sleeve 506 axially rearwardly to the position shown in FIGURE 28 where a rearwardly facing internal, annular shoulder 558 formed in sleeve 506 abuts head 518 of bolt 504. As a result of this motion, lock 548 and firing pin 120 are pulled axially rearwardly with swivel fitting 510 to compress spring 124. When the ends of fingers 549 clear the rearward edge of stepped bore 122, knuckle 544 is released with the result that firing pin 120 separates from lock 548, permitting spring 124 to urge pin 120 forwardly to fire primer 128. Charge 130 is thus ignited to cause ignition of the main body of rocket propellant 74 and a charge 559.

Similar to the first embodiment, housing 500 also mounts a second firing mechanism (not shown) which preferably is of the same construction as the firing mechanism just described and which is simultaneously actuatable with the firing mechanism just described to ignite propellant 74 and charge 559 when towlines 519 and 519a are pulled taut.

As shown in FIGURE 26, collar 528 is formed with an inwardly opening annular recess 562. Cross through bores 564 and 566 respectively formed in pins 522 and 523 are connected to recess 562 by substantially radially extending passages 568 and 570 which are formed in arms 524 and 526. Sheath contained mild detonating fuses generally indicated at 572 are contained in recess 562, bores 564 and 566, and passages 568 and 570. Fuses 572 extend along towlines 519 and 519a from arms 524 and 526 and are connected to charges 573 and 573a which are detonatable to cut towlines 519 and 519a for freeing the extracted occupant from rocket 494.

When collar 528 is axially shifted to the aft end of rocket 494 to displace swivel fitting 510 rearwardly to the position shown in FIGURE 28, recess 562 radially aligns with a radial bore 573b. Bore 573b communicates with the rearward end of a bore 575 which contains a length of mild detonating fuse 574. Fuse 574 is connected to a detonator 576 in bore 575. Bore 575 is formed in housing 500 along an axis that is parallel to, but laterally spaced from the rocket longitudinal axis.

Following the launching of rocket 494 and the ignition of the main body or rocket propellant 74, charge 559, which is contained in a metal well 577, burns out to expose its apertured bottom to chamber 72. Well 577 and a piston 578 carrying a firing pin 578a are mounted in bore 575. The combustion gases generated in chamber 72 pass through the apertured bottom of well 577 to urge piston 304 rearwardly to fire detonator 576 which in turn ignites fuse 574. Ignition of fuse 574 detonates fuses 572 which, in turn, detonates charges 573 and 573a to cut towlines 519 and 519a.

As shown in FIGURE 27, extension housing 500 is slidably and coaxially received in a forwardly opening bore 580 formed in a launching piston 582. Piston 582 is slidably and coaxially received in launching tube 532 which extends upwardly in radially spaced relation to casing 70 and which terminates at its forward end axially rearwardly of collar 528 when collar 528 is in its raised stored position adjacent to the forward end of rocket 494. The lower end of launching tube 532 coaxially receives a cylindrical section 586 of a breech block 588. Tube 532 is fixed to section 586 by any suitable means such as threading.

With continued reference to FIGURE 27, section 586 is coaxially formed with a smoth cylindrically walled forwardly opening recess 590 defining a pressure chamber 592 which is exposed to the rearwardly directed end face of piston 582. Pressure chamber 592 communicates through a venturi passage 594 with a combustion chamber 596 in breech block 588.

Still referring to FIGURE 27, two conventional cartridges 598 and 600 are mounted in combustion chamber 596. Cartridges 598 and 600 are respectively ignited by firing mechanisms 602 and 604. Firing mechanisms 602 and 604 each are substantially the same as the rocket launching firing mechanisms described in the first embodiment and to the extent that these firing mechanisms are the same, like reference numerals have been applied to designate like parts.

As shown in FIGURES 25 and 26, launching tube 532 is mounted rearwardly of seat 36 and is tilted forwardly to guide rocket 494 along an inclined, straight path passing over seat 36 and through the hatch opening of the aircraft. A support collar 608 suitably secured to the upper end of launching tube 532 is provided with an integral, rearwardly extending arm 610 through which a pivot pin 612 rotatably extends. Pin 612 is fixed to the frame of the aircraft to swingably support tube 532 about an axis extending at right angles to the longitudinal axis of tube 532.

With continued reference to FIGURE 27, an actuator 614 for swinging tube 532 about the axis of pin 612 comprises a power member or ram (not shown) which is slidably and coaxially received in a cylinder 616. Cylinder 616 is pivotally secured by a pin 618 to the frame of the aircraft above tube 532. An operating arm 620 fixed to the ram in cylinder 616 is pivotally secured by a pin 622 to arm 610 as shown. The axes of pins 612, 618, and 622 are in parallel spaced apart relationship.

Actuator 614 preferably is operated by ram air pressure to automatically position the tube 532 in a manner to be described in greater detail later on. It will be appreciated, however, that a suitable alternative means (not shown) may be employed to position tube 532 by extending and retracting arm 620.

When arm 620 is retracted, tube 532 is in its full line position shown in FIGURE 25 and preferably makes an angle of about 55 degrees with a normally vertical line to establish an optimum, forwardly inclined rocket launching path when the aircraft is traveling at relatively high speed. When the aircraft is traveling at low speeds, actuator 614 is operated to extend arm 620 and thereby swing tube 532 in a clockwise direction about the pivot axis of pin 612 to the phantom line position shown in FIGURE 25. In this latter position, the angle which tube 532 makes with a normally vertical line is preferably reduced to 25 degrees such that tube 532 is only slightly inclined.

Ram air used to position tube 532 is conveyed through suitable conduit means (not shown) to cylinder 616 from the exterior of the aircraft and the pressure of the ram air increases and decreases as the aircraft velocity respectively increases and decreases to automatically position tube 532. Thus, it is clear that tube 532 is swingable between its low and high aircraft speed positions to aim rocket 494 for launching along an optimum path passing through the aircraft hatch opening. Suitable stops (not shown) may be provided to limit the angular displacement of tube 532 between its low and high speed positions.

When the occupant of the aircraft desires to set the escape apparatus shown in FIGURES 25–28 in operation, he pulls a conventional D-handle 628 (see FIGURE 29) which is operatively connected through a suitable disconnect 629 and a motion transmitting cable assembly 630 to a standard canopy jettison release mechanism 632, to a shaped charge canopy cutter initiator 633, to firing mechanisms 602 and 604, and to an extraction rocket latch assembly 634.

In addition, cable assembly 630 is connected through an inertial reel lock control 635 to a conventional inertia reel 636 which has a standard manual control 637. Reel 636 is connected to control the tension in shoulder straps 638 connected to the occupant's torso harness in the usual manner. Latch assembly 634 may be of any suitable form for securing rocket 494 in its stored position within the aircraft and for purposes of this invention is only schematically shown.

Initiator 633 is of standard, delayed action construction for detonating shaped charges (not shown) which are secured to the body of the aircraft for cutting loose canopy 32. Preferably, initiator 633 detonates the unshown, canopy cutting, shaped charges about 0.3 second after ring 628 is pulled by the occupant. Cartridges 598 and 600 are also of conventional delayed action type and preferably detonate about 0.5 second after handle 628 is pulled to withdraw pins 180 of firing mechanisms 602 and 604. As previously described, pins 180 of firing mechanisms 602 and 604 separate from pins 182 when the interlocked ends of pins 180 and 182 are withdrawn by pulling handle 628. By releasing firing pins 182 they are advanced by their springs to detonate initiators forming a part of cartridges 598 and 600.

When handle 628 is pulled, mechanism 632 is actuated to jettison canopy 32 in the usual manner and latch assembly 634 releases rocket 494 so that it can be launched from the aircraft. After a delay of about 0.3 second, initiator 633 is detonated to detonate the shaped charges for cutting canopy 32 loose in the event the mechanism 632 fails to jettison the canopy. After canopy 32 is jettisoned or cut loose, cartridges 598 and 600 ignite.

The gases generated by ignition of cartridges 598 and 600 enter pressure chamber 592 through passage 594 to urge piston 582 and rocket 494 toward the forward end of launching tube 532. As rocket 494 moves out of launching tube 532, pin 530 is sheared, leaving collar 528 secured to tube 532 by pins 533. Rocket 494 slides through collar 528 until piston 582 reaches the forward end of tube 532 where it strikes collar 528 with sufficient impact to shear pins 533. As a result, collar 528 is freed from tube 532 and moves away from tube 532 at the same velocity as rocket 474. The impact of engaging piston 582 with collar 528 is sufficient to separate piston 582 from rocket 494.

Rocket 494, still unignited, moves out of tube 532 and through the aircraft hatch opening along its launching path with collar 528 being disposed adjacent the aft end of casing 70. When rocket 494 reaches the end of towlines 519 and 519a the initial tension applied through lines 519 and 519a pulls on collar 528 to slide it to the aft end of housing 500 where it shoulders on fitting 510, displacing it rearwardly to the position shown in FIGURE 28. By displacing fitting 510 to its rearward position spaced from housing 500, lock 548 is pulled from bore 538, permitting firing pin 120 to be urged forwardly under the bias of spring 124 to fire detonator 128. As a result, charge 130 is fired to ignite the rocket propellant 74 and charge 559.

By igniting propellant 74, rocket 494 moves under its own power away from the aircraft to exert an upward pull on the occupant of the aircraft. The tension applied through lines 519 and 519a may be transmitted to rotate a tube such as tube 282 to release seat 36 from mechanism 364 and thus allow the upward force exerted by rocket 494 to be transmitted through the occupant's torso harness to pull seat back 38 upwardly by a limited distance along guide rails 700 (one shown in FIGURE 25). Also fully described in Ser. No. 390,709, this seat motion results in the formation of a chute for straightening the occupant's posture. The tension applied through towlines 519 and 519a may be transmitted to also release the occupant's restraint straps as described in Ser. No. 390,709.

When released from seat 36, the occupant is then extracted from the aircraft by rocket 494.

Just prior to burn out of the main body of rocket propellant, charge 559 burns out to effect detonation of charges 573 and 573a for cutting towlines 519 and 519a in the manner previously described. After the extracted occupant is separated from rocket 342, his recovery parachute is deployed to provide for his safe descent to the ground.

What is claimed and desired to be secured by Letters Patent is:

1. An escape apparatus for removing an occupant from a vehicle capable of being airborne and comprising a rocket, means mounting said rocket in said vehicle, means securing said rocket to said occupant, and means for launching and igniting said rocket to remove said occupant from said vehicle, said means mounting said rocket comprising means for applying a force to said rocket at least during vehicle flight and prior to launching and ignition of said rocket to swing said rocket between angularly spaced apart positions for varying the inclination of the rocket launching path.

2. An escape apparatus for removing a load from a moving vehicle and comprising a rocket mounted in said vehicle, means for launching and igniting said rocket for flight away from said vehicle, a flexible towline, means so securing said towline to said rocket and said load that it is pulled taut by flight of said rocket away from said vehicle to extract said load from said vehicle, means supporting said rocket in said vehicle for swinging movement about a pivot axis extending normal to the longitudinal axis of said rocket, and means for selectively swinging said rocket about said pivot axis between angularly spaced apart positions prior to launching and ignition of said rocket for varying the inclination of the rocket launching path.

3. An apparatus for removing a load from a vehicle and comprising a rocket mounted in a stored position in said vehicle, means adapted to secure said rocket to said load, control means adapted to be selectively actuated when it is desired to effect removal of said load, means activated by actuation of said control means for displacing said rocket from said stored position to a generally erect launching position at least during vehicle flight, and further means activated by actuation of said control means for launching said rocket from said launching position for ignited flight away from said vehicle to remove the load therefrom.

4. An apparatus for removing a load from a moving vehicle and comprising a rocket mounted in said vehicle, means adapted to secure said rocket to said load, means for launching said rocket for flight away from said vehicle to remove said load therefrom and means responsive to the speed of said vehicle for controlling the launch position of said rocket.

5. An escape apparatus for removing an occupant from a vehicle having a canopy adapted to extend over the vehicle space receiving said occupant, said escape apparatus comprising a rocket adapted to be secured to said occupant and being launchable from said vehicle to remove said occupant from said space, means for erecting said rocket to a launch position in said vehicle before launching said rocket, and means for transmitting the force applied to erect said rocket to urge said canopy out of the launch path of said rocket and the path of occupant removal.

6. The escape apparatus defined in claim 5 wherein said force transmitting means comprises a part on said rocket, said part being adapted to engage said canopy as it is being erected.

7. The escape apparatus defined in claim 6 wherein said rocket is erected to its launch position from a stowed, prone position in said vehicle.

8. The escape apparatus defined in claim 5 wherein said rocket is adapted to engage said canopy to throw said canopy upwardly and rearwardly.

9. The escape apparatus defined in claim 8 wherein said rocket is adapted to rotate said canopy about a rearward attachment to said vehicle.

10. The escape apparatus defined in claim 8 wherein said rocket is normally spaced from said canopy and is adapted to abut the roof of said canopy as it is displaced toward its launch position.

11. The escape apparatus defined in claim 7 wherein said rocket is mounted in said vehicle rearwardly of said space and wherein said rocket is secured to said occupant by a towline, the flight of said rocket away from said vehicle being effective to pull said towline taut for extracting said occupant from said vehicle.

12. An escape apparatus for removing an occupant from a space in a vehicle and comprising a rocket mounted in a stowed, essentially prone position in said vehicle, means adapted to secure said rocket to said occupant, escape control means adapted to be actuated by said occupant for effecting the launching of said rocket for ignited flight away from said vehicle to remove the occupant therefrom, and means responsive to the actuation of said escape control means for displacing said rocket from said prone position to a launch position before said rocket is launched for flight away from said vehicle.

13. The escape apparatus defined in claim 12 wherein said rocket is mounted in said vehicle rearwardly of said space and is erected by said displacing means to said launch position.

14. The escape apparatus defined in claim 12 wherein said rocket is rotated by said displacing means about an axis extending transversely with respect to the longitudinal axis of said rocket.

15. The escape apparatus defined in claim 12 wherein simultaneous rotational and translational movement is imparted to said rockt as it is displaced from said stowed position to said launch position.

16. The escape apparatus defined in claim 12 wherein said rocket is stowed to the rear of said space and is mounted (a) for rotation about an axis extending perpendicularly with respect to the rocket longitudinal axis and (b) for translational movement along a linear path extending parallel to a plane containing the rocket longitudinal axis, said displacing means being effective to erect said rocket by rotating it about said perpendicularly extending axis and simultaneously shifting said rocket along said linear path to move it closer to said space.

17. The escape apparatus defined in claim 14 wherein said displacing means is operative to rotate said rocket to a plurality of relatively erected, angularly spaced apart launch positions and wherein means responsive to the vehicle speed are provided for determining the launch position to which said rocket is rotated.

18. The escape apparatus defined in claim 12 wherein said rocket is mounted on said launching means and wherein said launching means is mounted in said vehicle for rotation about an axis extending transversely of the rocket longitudinal axis at the rearward end of said rocket.

19. The escape apparatus defined in claim 12 wherein said rocket displacing means comprises a cylinder, a piston slidable in said cylinder, means operatively connecting said piston to said rocket to effect erection of said rocket by displacement of said piston, and means providing a source of fluid pressure for displacing said piston.

20. The escape apparatus defined in claim 12 wherein said securing means comprises a flexible towline secured to the rearward end of said rocket, the flight of said rocket away from said vehicle being effective to pull said towline taut for extracting the occupant from said vehicle.

21. The escape apparatus defined in claim 3 wherein said rocket is mounted by said launching means in said vehicle and wherein said launching means is movable with said rocket as the latter is displaced from said stored position to said launch position.

22. The apparatus defined in claim 21 wherein said launching means comprises a pair of launching elements disposed at least generally on diametrically opposite sides of said rocket and extending substantially parallel to the rocket longitudinal axis.

23. An escape apparatus for removing an occupant from a space in a vehicle and comprising a rocket mounted in said vehicle, means adapted to secure said occupant to said rocket, means for launching said rocket for ignited flight away from said vehicle to remove the occupant therefrom and means for bodily and forwardly shifting said rocket from a position disposed rearwardly of said space prior to launching.

24. An escape apparatus for removing an occupant from a vehicle comprising a rocket, means adapted to secure said rocket to said occupant, escape control means adapted to be actuated by said occupant, means responsive to actuation of said escape control means for effecting the launching and ignition of said rocket for flight away from said vehicle to remove the occupant therefrom, and means rendered operable by actuation of said control means for positioning said rocket in one of a plurality of angularly related launch positions to vary the inclination of the rocket launching path prior to the launching of said rocket.

25. The escape apparatus defined in claim 24 wherein said means for positioning said rocket is under the control of the vehicle speed and wherein said rocket is rotated by said positioning means about an axis extending transversely of its longitudinal axis.

26. The escape apparatus defined in claim 25 wherein the angle between the rocket longitudinal axis and the horizontal plane of the vehicle is varied by said positioning means inversely with respect to the vehicle speed.

27. The escape apparatus defined in claim 24 wherein said rocket is provided with at least one high vehicle speed launch position and at least one low vehicle speed launch position, said rocket being more erect in its low speed launch position than in its high speed launch position.

28. The escape apparatus defined in claim 24 wherein said rocket is mounted in said vehicle to the rear of the vehicle space receiving said occupant.

29. The escape apparatus defined in claim 24 wherein said rocket is stowed in said vehicle at an inclination which is less than its inclination at any of said launch positions.

30. The escape apparatus defined in claim 24 wherein said rocket is mounted for rotation by said positioning means about an axis extending transversely of the rocket longitudinal axis, said apparatus further comprising a fixed stop for limiting displacement of said rocket by said positioning means to a first launch position and a movable stop responsive to vehicle speed for limiting rocket displacement to a second launch position, with said first and second launch positions being angularly spaced apart.

31. The escape apparatus defined in claim 24 wherein said securing means comprises an occupant towline secured to the rearward end of said rocket, the flight of said rocket away from said vehicle being effective to pull said towline taut for extracting the occupant from said vehicle.

32. An escape apparatus for removing an occupant or other load from a vehicle comprising a rocket mounted in said vehicle, means adapted to secure said rocket to said occupant, and a dual launcher for launching said rocket for flight away from said vehicle to remove the occupant therefrom, said dual launcher having a pair of launching elements disposed at least generally on diametrically opposite sides of said rocket and being substantially parallel with the rocket longitudinal axis.

33. The escape apparatus defined in claim 32 wherein said dual launcher further comprises a pair of launching tubes positioned on diametrically opposite sides of said rocket and slidably receiving respective ones of said elements, means for ejecting said elements from said tubes, and means operatively connecting said elements to said rocket to transmit the element ejecting force to launch said rocket.

34. The escape apparatus defined in claim 33 wherein said rocket has a pair of radially extending arms formed with sockets and wherein said means operatively connecting said elements to said rocket comprises fittings on said elements and being seated in said sockets.

35. The escape apparatus defined in claim 33 wherein said means operatively connecting said elements to said rocket provides for the separation of said elements from said rocket after said elements are ejected from said tubes.

36. The apparatus defined in claim 33 wherein said rocket is of the tractor type having exhaust nozzle means only adjacent to its forward end.

37. An escape apparatus for removing an occupant from a space in a vehicle and comprising a rocket mounted in a stowed, essentially prone position in said vehicle, means adapted to secure said rocket to said occupant, means for displacing said rocket from said stowed position to a launch position, and means for launching said rocket when in its launched position for ignited flight away from said vehicle to remove the occupant therefrom, said launching means being displaced together with said rocket from said stowed position to said launch position.

38. An escape apparatus for removing an occupant from a space in a vehicle and comprising a rocket mounted in a stowed, essentially prone position in said vehicle, means adapted to secure said rocket to said occupant, means for displacing said rocket from said stowed position to a launch position, and means for launching said rocket when in its launched position for ignited flight away from said vehicle to remove the occupant therefrom, said rocket and said launching means being supported by said displacing means at least in the stowed position.

39. An escape apparatus for removing an occupant from a vehicle comprising a rocket, means adapted to secure said rocket to said occupant, means for positioning said rocket in one of a plurality of angularly related launch positions to vary the inclination of the rocket launching path and means for launching said rocket for ignited flight away from said vehicle to remove the occupant therefrom, said rocket being supported on said launching means, and said launching means being mounted in said vehicle for rotation about an axis extending substantially perpendicularly with respect to the rocket longitudinal axis.

40. The escape apparatus defined in claim 1 wherein said rocket launching means includes control means adapted to be manipulated by said occupant to effect the launching of said rocket, and wherein said force applying means is under the control of said control means.

41. An escape apparatus for removing an occupant from an air or space vehicle and comprising a rocket mounted in a generally prone position in said vehicle means for connecting said rocket to said occupant, and means operated by said occupant to initiate his escape from the vehicle and including means for displacing said rocket from said prone position to a generally erected launching position and means for launching said rocket from said launching position for ignited flight away from said vehicle to remove the occupant therefrom.

References Cited

UNITED STATES PATENTS

| | | | |
|---|---|---|---|
| 2,331,309 | 10/1943 | Curriston | 244—137 |
| 2,751,171 | 6/1956 | Martin | 244—122 X |
| 2,900,150 | 8/1959 | Hirt | 244—122 |
| 3,115,320 | 12/1963 | Hirt | 244—122 |
| 3,124,324 | 3/1964 | Martin | 244—122 |
| 3,190,589 | 6/1965 | Memborg | 244—122 |

MILTON BUCHLER, *Primary Examiner.*

T. W. BUCKMAN, *Assistant Examiner.*

U.S. Cl. X.R.

244—122